US009933831B2

(12) United States Patent
Chosokabe

(10) Patent No.: US 9,933,831 B2
(45) Date of Patent: Apr. 3, 2018

(54) POWER CONTROL SYSTEM, POWER CONTROL METHOD, AND INFORMATION PROCESSING DEVICE

(71) Applicant: Kiriko Chosokabe, Tokyo (JP)

(72) Inventor: Kiriko Chosokabe, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/961,980

(22) Filed: Dec. 8, 2015

(65) Prior Publication Data
US 2016/0179172 A1    Jun. 23, 2016

(30) Foreign Application Priority Data

Dec. 17, 2014   (JP) .................................. 2014-255404

(51) Int. Cl.
G06F 1/00         (2006.01)
G06F 1/32         (2006.01)
G06F 1/26         (2006.01)

(52) U.S. Cl.
CPC ............ G06F 1/3209 (2013.01); G06F 1/266 (2013.01); G06F 1/3231 (2013.01); Y02B 60/1289 (2013.01)

(58) Field of Classification Search
CPC ....... G06F 1/3209; G06F 1/266; G06F 1/3231
USPC .................. 713/323, 320; 358/1.14; 250/205
See application file for complete search history.

(56) References Cited

U.S. PATENT DOCUMENTS

| 7,698,574 | B2 | 4/2010 | Morimoto et al. |
| 8,593,656 | B2 | 11/2013 | Kuroishi et al. |
| 2009/0119525 | A1* | 5/2009 | Morimoto .............. B41J 29/393 713/323 |

(Continued)

FOREIGN PATENT DOCUMENTS

| CN | 100430234 C | 11/2008 |
| CN | 101888461 A | 11/2010 |

(Continued)

OTHER PUBLICATIONS

Office Action for corresponding Chinese App. No. 201510947280.1 dated Sep. 22, 2017 and English translation thereof.

*Primary Examiner* — Aurel Prifti
(74) *Attorney, Agent, or Firm* — Harness, Dickey n & Pierce, PLC

(57) ABSTRACT

A power control system includes: an information processing device including: a determining unit that determines whether to supply power to a device from a power supplying unit, based on first correspondence information, in which an output signal detected by a detecting unit of each of at least one electronic device is associated with identification information of a corresponding electronic device, received from the corresponding electronic device, and a stored second correspondence information, in which identification information to identify a power supplying unit of a power source control device that supplies power to a device is associated with identification information of each of the at least one electronic device, and an instruction unit that instructs the power source control device to supply power or to shut off power supply to a device from the power supplying unit, according to a determination result of the determining unit.

20 Claims, 13 Drawing Sheets

(56) References Cited

U.S. PATENT DOCUMENTS

| | | | | |
|---|---|---|---|---|
| 2009/0210732 A1* | 8/2009 | Aoyagi | ............ | H04N 1/00885 713/320 |
| 2010/0290074 A1* | 11/2010 | Kuroishi | ............ | G03G 15/5004 358/1.14 |
| 2011/0173473 A1* | 7/2011 | Cho | ...................... | G06F 1/3203 713/323 |
| 2013/0205153 A1* | 8/2013 | Yokoyama | ............ | G06F 1/3275 713/323 |
| 2014/0027606 A1* | 1/2014 | Raynor | ................ | G06F 3/0421 250/205 |

FOREIGN PATENT DOCUMENTS

| | | |
|---|---|---|
| JP | 2013-098822 | 5/2013 |
| JP | 2014-153835 | 8/2014 |

\* cited by examiner

FIG.5

| LATEST ACQUISITION | OUTLET #1 | OUTLET #2 | OUTLET #3 | OUTLET #4 |
|---|---|---|---|---|
| TAP A01 | ON | ON | ON | OFF |
| TAP A02 | ON | ON | ON | ON |
| TAP A03 | OFF | OFF | OFF | OFF |
| TAP A04 | ON | ON | ON | ON |
| TAP A05 | OFF | OFF | ON | ON |

FIG.6

| ELECTRONIC DEVICE ID | OUTPUT SIGNAL (lux) |
|---|---|
| 0001 | 13 |
| 0002 | 400 |
| 0003 | 0 |
| 0004 | 30 |
| 0005 | 1000 |

FIG.7

| LATEST ACQUISITION | OUTLET #1 | OUTLET #2 | OUTLET #3 | OUTLET #4 |
|---|---|---|---|---|
| TAP A01 | 100 W | 20 W | 300 W | 0 W |
| TAP A02 | 50 W | 300 W | 100 W | 500 W |
| TAP A03 | 0 W | 0 W | 0 W | 0 W |
| TAP A04 | 300 W | 100 W | 100 W | 500 W |
| TAP A05 | 0 W | 0 W | 100 W | 50 W |

FIG.8

| ELECTRONIC DEVICE ID | TAP ID | OUTLET ID | OUTLET ID | OUTLET ID | OUTLET ID |
|---|---|---|---|---|---|
| 0001 | A01 | #1 | #2 | #3 | #4 |
| 0002 | A02 | #1 | #2 | #3 | #4 |
| 0003 | A03 | #1 | #2 | #3 | #4 |
| 0004 | A04 | #1 | #2 | #3 | #4 |
| 0005 | A05 | #1 | #2 | #3 | #4 |

FIG.9

| ELECTRONIC DEVICE ID | TAP ID | DETERMINATION RESULT |
|---|---|---|
| 0001 | A01 | SHUT OFF POWER |
| 0002 | A02 | SUPPLY POWER |
| 0003 | A03 | SHUT OFF POWER |
| 0004 | A04 | SUPPLY POWER |
| 0005 | A05 | SHUT OFF POWER |

POWER CONTROL SYSTEM, POWER CONTROL METHOD, AND INFORMATION PROCESSING DEVICE

CROSS-REFERENCE TO RELATED APPLICATIONS

The present application claims priority to and incorporates by reference the entire contents of Japanese Patent Application No. 2014-255404 filed in Japan on Dec. 17, 2014.

BACKGROUND OF THE INVENTION

1. Field of the Invention

The present invention relates to a power control system, a power control method, and an information processing device.

2. Description of the Related Art

Conventionally, there are known management devices, which is called as intelligent taps, smart taps or the like, capable of controlling power supply to an electrical device connected to a tap through a power line, to manage power. With such a management device, for example, control to selectively stop the power supply to an electrical device, to which power need not be supplied, and the similar control can be performed.

An object of the present invention is to provide a power control system, a power control method, and an information processing device that can efficiently control power to a device.

SUMMARY OF THE INVENTION

It is an object of the present invention to at least partially solve the problems in the conventional technology.

A power control system includes: at least one electronic device; an information processing device; and a power source control device. Each of the at least one electronic device includes: a detecting unit that detects an output signal from a detector, and a signal transmitting unit that transmits first correspondence information in which an output signal detected by the detecting unit is associated with identification information of a corresponding electronic device. The information processing device includes: a communication unit that receives the first correspondence information; a correspondence information storage unit that stores therein second correspondence information in which identification information to identify a power supplying unit of the power source control device that supplies power to a device is associated with identification information of each of the at least one electronic device; a determining unit that determines whether to supply power to a device from a power supplying unit, based on the first correspondence information and the second correspondence information; and an instruction unit that instructs the power source control device to supply power or to shut off power supply to a device from a power supplying unit, according to a determination result of the determining unit. The power source control device includes a power source control unit that performs control to supply power or to shut off power supply to a device from the power supplying unit, according to an instruction from the instruction unit.

A power control method is of a power control system including at least one electronic device, an information processing device, and a power source control device. The power control method includes: detecting an output signal from a detector provided in each of the at least one electronic device; transmitting a signal to transmit first correspondence information in which an output signal detected at the detecting is associated with identification information of a corresponding electronic device; communicating to receive the first correspondence information; storing second correspondence information in which identification information to identify a power supplying unit of the power source control device that supplies power to a device is associated with identification information of each of the at least one electronic device; determining whether to supply power to a device from a power supplying unit, based on the first correspondence information and the second correspondence information; instructing the power source control device to supply power or to shut off power supply to a device from a power supplying unit, according to a determination result at the determining; and controlling a power source to supply power or to shut off power supply to a device from a power supplying unit, according to an instruction at the instructing.

An information processing device includes: an acquiring unit that acquires first correspondence information in which an output signal from a detector provided in each of at least one electronic device is associated with identification information of a corresponding electronic device; a correspondence information storage unit that stores therein second correspondence information in which identification information to identify a power supplying unit of a power source control device that supplies power to a device is associated with identification information of each of the at least one electronic device; a determining unit that determines whether to supply power to a device from a power supplying unit, based on the first correspondence information and the second correspondence information; and an instruction unit that instructs the power source control device to supply power or to shut off power supply to a device from a power supplying unit, according to a determination result of the determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a display screen showing the status of a plurality of taps when power is applied or when power is shut off;

FIG. 6 is a diagram illustrating an example of first correspondence information;

FIG. 7 is a diagram illustrating an example of a display screen showing the power consumption status at an instance;

FIG. 8 is a diagram illustrating an example of second correspondence information;

FIG. 9 is a diagram for explaining determination results of a determining unit;

DETAILED DESCRIPTION OF THE PREFERRED EMBODIMENTS

A power control system, a power control method, and an information processing device according to the present invention will now be described with reference to the accompanying drawings. However, the present invention is not limited to the following embodiments. Each embodiment may be combined as appropriate within a range where the contents do not contradict. In the following, as an example, an information processing device according to the present invention is applied to a multifunction peripheral (MFP). However, it is not limited thereto. The MFP is a device that includes at least two functions of a printer function, a copy function, a scanner function, and a facsimile function.

First Embodiment

Figure 1:
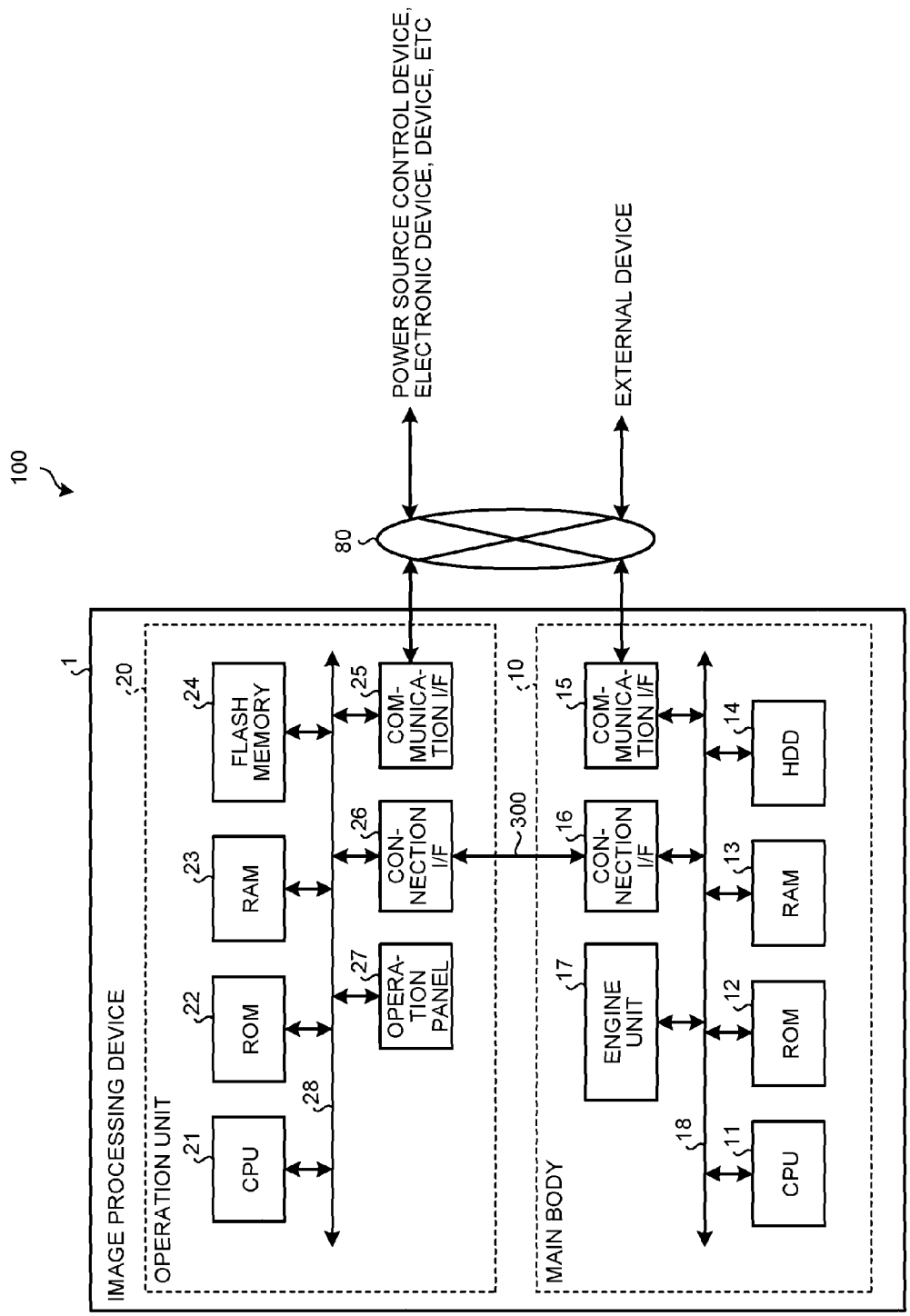
FIG. 1 is a diagram illustrating an example of a hardware configuration of a power control system according to a first embodiment.

With reference to FIG. 1, a hardware configuration of a power control system will now be described. FIG. 1 is a block diagram illustrating an example of a hardware configuration of a power control system according to the present embodiment.

As illustrated in FIG. 1, a power control system 100 includes an image processing device 1, a power source control device, an electronic device, and a device. The image processing device 1 is connected to the power source control device and the electronic device via a network 80 such as a Local Area Network (LAN) and the Internet. In FIG. 1, the number of the image processing device 1 connected to the power source control device, the electronic device, and the like is only one. However, it is not limited thereto, and the number of the image processing device 1 is optional.

The image processing device 1 includes a main body 10 that can achieve various functions such as a printer function, a copy function, a scanner function, a facsimile function, and the like. The image processing device 1 also includes an operation unit 20 that receives an input according to a user operation. The main body 10 and the operation unit 20 are communicably connected to each other via an exclusive communication path 300. For example, the communication path 300 may have the Universal Serial Bus (USB) standard. However, either wired or wireless, any standard may be used.

The main body 10 operates according to an input received from the operation unit 20. The main body 10 can also communicate with any external device, and may operate according to an instruction received from the external device.

The main body 10 includes a central processing unit (CPU) 11, a read-only memory (ROM) 12, a random access memory (RAM) 13, a hard disk drive (HDD) 14, a communication interface (I/F) 15, a connection I/F 16, and an engine unit 17, all connected to a system bus 18.

The CPU 11 integrally controls the operation of the main body 10. The CPU 11 controls the overall operation of the main body 10, by executing computer programs stored in the ROM 12, the HDD 14, or the like, using the RAM 13 as a work area (working region). The CPU 11 also implements various functions such as the printer function, the copy function, the scanner function, and the facsimile function described above.

The ROM 12 stores therein computer programs executed when the image processing device 1 is activated and various types of data. The RAM 13 temporarily holds various computer programs and data read out from the ROM 12 and the HDD 14.

The controller is configured of the CPU 11, the ROM 12, and the RAM 13. For example, when print data is received via a data communication I/F, the CPU 11 executes a computer program (PDL parser) capable of interpreting page description language (PDL) read out from the ROM 12 to the RAM 13, and the print data is interpreted to generate a bitmap image.

The HDD 14 stores therein various types of data such as received document data and read image data that are handled by the image processing device 1, and data used by each application. The HDD 14 manages the various types of data by using a predetermined file system and a database (DB). The various types of data stored in the HDD 14 include data input from a recording medium. The recording medium is set in a drive device included in a storage media I/F, and various types of data are stored in the HDD 14 from the recording medium via the drive device.

The communication I/F 15 is an interface for communication with an external device. The communication I/F 15 is an interface that connects the image processing device 1 with a data transmission line such as a network and a facsimile. The connection I/F 16 is an interface for communication with the operation unit 20 via the communication path 300.

The engine unit 17 is hardware that executes processing other than general information processing and communication, to implement a printer function, copy function, scanner function, facsimile function, and the like. For example, the engine unit 17 includes a scanner that scans and reads a document, a plotter that prints on a sheet material such as a sheet, and a facsimile unit that performs facsimile communication. The scanner includes an image reading device, and generates image data by optically reading a document disposed on a reading surface. The plotter includes a printing device, and for example, prints a bitmap image on a recording sheet by an electrophotographic process system. The engine unit 17 may also include specific options such as a finisher that sorts printed sheet materials and an automatic document feeder (ADF) that automatically feeds documents.

The operation unit 20 includes a CPU 21, a ROM 22, a RAM 23, a flash memory 24, a communication I/F 25, a connection I/F 26, and an operation panel 27, all connected to a system bus 28.

The CPU 21 integrally controls the operation of the operation unit 20. The CPU 21 controls the overall operation of the operation unit 20, by executing computer programs stored in the ROM 22, the flash memory 24, or the like, using the RAM 23 as a work area (working region). The CPU 21 also implements various functions such as to display information (image) corresponding to an input received in a user operation.

The communication I/F 25 is an interface for communication with the power source control device, the electronic device, the device, and the like, via the network 80. The communication I/F 25 is an interface that connects the image processing device 1 with a data transmission line such as a network and a facsimile. The connection I/F 26 is an interface for communication with the main body 10 via the communication path 300.

The operation panel 27 receives various inputs according to a user operation, and displays various types of information. For example, the various types of information include information corresponding to a received input, information indicating the operation status of the image processing device 1, and information indicating the setting status. In the present embodiment, the operation panel 27 is composed of a liquid crystal display (LCD) having a touch panel function. However, it is not limited thereto. For example, the operation panel 27 may be composed of an organic electroluminescence (EL) display device having a touch panel function. In addition to this, or alternatively, an operation unit such as a hardware key and a display unit such as a lamp may also be provided.

Figure 2:
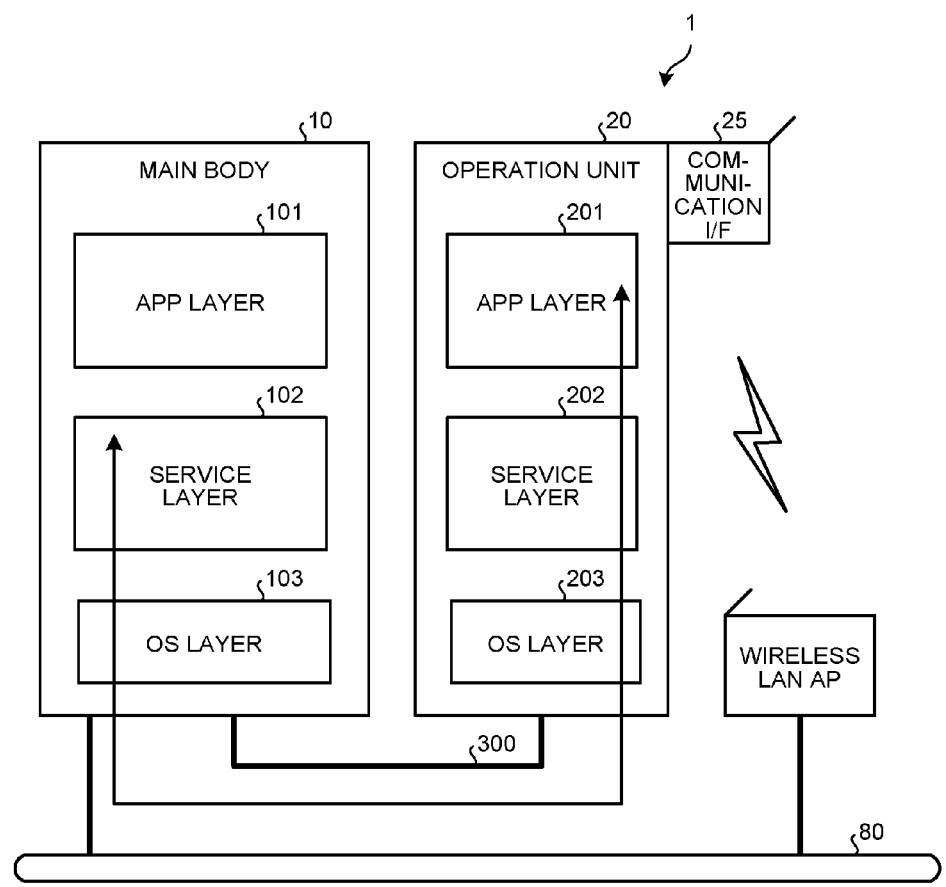
FIG. 2 is a diagram illustrating an example of a software configuration of an image processing device according to the first embodiment.

With reference to FIG. 2, a software configuration of the image processing device 1 will now be described. FIG. 2 is a diagram illustrating an example of a software configuration of an image processing device.

As illustrated in FIG. 2, the main body 10 includes an app layer 101, a service layer 102, and an operating system (OS) layer 103. The app layer 101, the service layer 102, and the OS layer 103 are various pieces of software stored in the ROM 12, the HDD 14, and the like. The CPU 11 executes these pieces of software to provide various functions.

The software for the app layer 101 is application software (hereinafter, may be referred to as "app") to provide a certain function by operating hardware resources. Examples of the app include a copying app to provide a copy function, a scanner app to provide a scanner function, a facsimile app to provide a facsimile function, and a printer app to provide a printer function.

The software for the service layer 102 is interposed between the app layer 101 and the OS layer 103, and is software to provide an interface to use the hardware resources included in the main body 10, with respect to the app. More specifically, such software provides functions such as to receive operation requests to the hardware resources and to arbitrate the operation request. Examples of the operation requests received by the service layer 102 include request for the scanner to read and a request for the plotter to print.

The interface function of the service layer 102 is provided not only to the app layer 101 of the main body 10, but also to an app layer 201 of the operation unit 20. In other words, the app layer 201 of the operation unit 20 can also implement the function of using the hardware resources (such as the engine unit 17) of the main body 10, via the interface function of the service layer 102.

The software for the OS layer 103 is basic software (operating system) for providing basic functions to control hardware included in the main body 10. The software for the service layer 102 converts requests to use the hardware resources from various apps into commands interpretable by the OS layer 103, and delivers them to the OS layer 103. The hardware resources perform operations according to the apps, when the software for the OS layer 103 executes the commands.

The operation unit 20 includes an app layer 201, a service layer 202, and an OS layer 203. The layered structure of the app layer 201, the service layer 202, and the OS layer 203 included in the operation unit 20 are the same as that in the main body 10. However, the functions provided by the apps of the app layer 201, and the types of operation requests that can be received by the service layer 202 are different from those of the main body 10. The app in the app layer 201 is software for providing a certain function by operating the hardware resources included in the operation unit 20. The app in the app layer 201 includes software to provide a user interface (UI) function for operating and displaying the functions (printer function, copy function, scanner function, and facsimile function) provided in the main body 10. The app in the app layer 201 also includes software (hereinafter, may be referred to as a "power management app") to provide a function to control power to each device, via the power source control device.

In the present embodiment, to maintain the independence of functions, the software for the OS layer 103 in the main body 10 and the software for the OS layer 203 in the operation unit 20 are different from each other. In other words, the main body 10 and the operation unit 20 operate independently from each other with different operating systems. For example, Linux (registered trademark) may be used as the software for the OS layer 103 in the main body 10, and Android (registered trademark) may be used as the software for the OS layer 203 in the operation unit 20.

As described above, in the image processing device 1 according to the present embodiment, the main body 10 and the operation unit 20 operate with different operating systems. Consequently, the communication between the main body 10 and the operation unit 20 are performed as a communication between different devices, instead of an inter-process communication in the common device. For example, an operation (command communication) to deliver an input (contents instructed in a user operation) received by the operation unit 20 to the main body 10, and an operation to notify the operation unit 20 of an event from the main body 10 are performed as the communication between different devices. Thus, by performing command communication with the main body 10, the operation unit 20 can use the functions of the main body 10. The events that the operation unit 20 is to be notified from the main body 10 include an operation execution status in the main body 10, and the contents set in the main body 10.

In the present embodiment, the power to the operation unit 20 is supplied from the main body 10 via the communication path 300. Hence, power to the operation unit 20 is controlled separately (independently) from controlling power to the main body 10.

Figure 3:
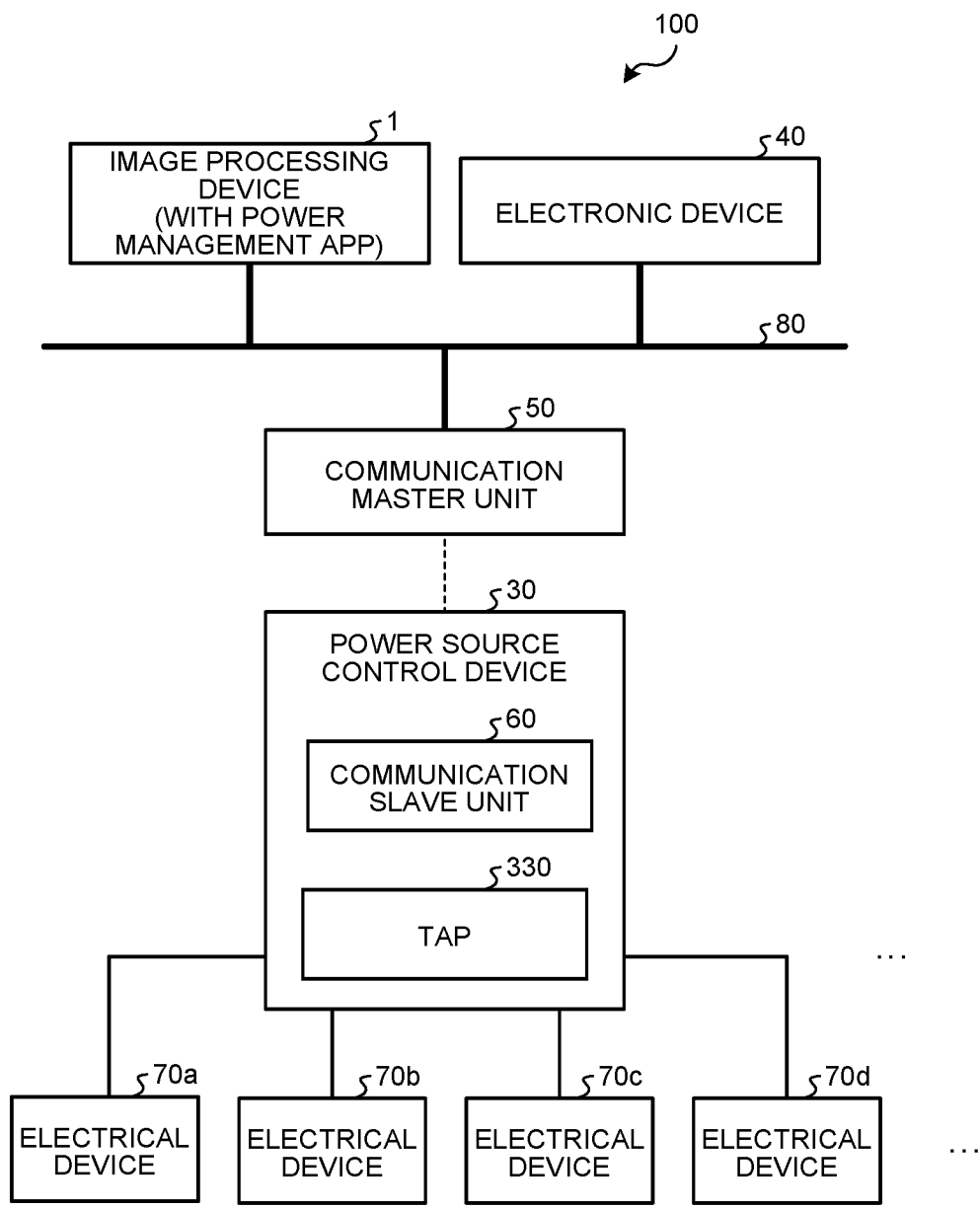
FIG. 3 is a diagram illustrating an example of a system configuration of the power control system according to the first embodiment.

With reference to FIG. 3, a system configuration of the power control system 100 will now be described. FIG. 3 is a diagram illustrating an example of a system configuration of a power control system.

As illustrated in FIG. 3, the power control system 100 includes the image processing device 1, a power source control device 30, an electronic device 40, a communication master unit 50, and electrical devices 70a to 70d. In the following explanation, if the electrical devices 70a to 70d need not be differentiated, they are simply referred to as a "device 70". The power source control device 30 includes a communication slave unit 60 and a tap 330. Hereinafter, the "tap" is also referred to as a "power supplying unit".

In the example illustrated in FIG. 3, the image processing device 1 is connected to each of the electronic device 40, the communication master unit 50, the power source control device 30, and the devices 70, via the network 80 such as the LAN. The communication master unit 50 is a master unit, and communicates with the communication slave unit 60 which is a slave unit included in the power source control device 30. The communication master unit 50 can communicate with the communication slave unit 60 in each of a plurality of power source control devices 30.

As described above, the image processing device 1 is the MFP loaded with a power management app, and controls power to each of the devices 70 via the power source control device 30, by executing the power management app. The electronic device 40, for example, may be an image processing device including a detector (sensor). Hereinafter, the "detector" is also referred to as a "sensor". The sensor corresponds to the "detector" in the claims.

The communication master unit 50 and the communication slave unit 60 implement communication between the image processing device 1 and the power source control device 30, and communication between the electronic device 40 and the power source control device 30.

The power source control device 30 performs, under the control of the image processing device 1, control to supply power and to shut off power supply to each device 70 from the power supplying unit (tap) 330 that supplies power to each device 70. The power source control device 30 also controls the application of power and shutting off of power to each device 70. Although a detailed description will be omitted, the power source control device 30 is configured to include the power supplying unit (tap) 330 that supplies power to the device 70. The tap 330 is connected to a power source line, which is not shown, and has a plurality of outlets (insert ports), to which respective devices 70 are connected. The power source control device 30 according to the present embodiment also includes a function to monitor the power consumption of the device 70 connected to the outlet of the tap 330. The device 70 operates by receiving power supply from the power source control device 30. The number of the device 70 included in the power control system 100 is optional.

In FIG. 3, the number of the image processing device 1, the power source control device 30, the electronic device 40, and the communication master unit 50 is one each. However, it is not limited thereto, and the number of the image processing device 1, the power source control device 30, the electronic device 40, and the communication master unit 50 is optional.

The power control system 100 according to the present embodiment judges that the place where the electronic device 40 is installed, for example, has become dark, from the output signal from the detector (for example, an illuminance sensor) provided in the electronic device 40. In other words, the power control system 100 judges that a user who uses the electronic device 40 is not present. The power control system 100 then shuts off the power supply to the device 70 that is connected to the outlet of the tap 330 of the power source control device 30 associated with the electronic device 40. In other words, when the tap 330 of the power source control device 30 associated with the electronic device 40, for example, is installed around the electronic device 40, the power control system 100 judges that the user who uses the electronic device 40 is not present, and shuts off the electric supply to the device 70 connected to the outlet of the tap 330 arranged around the electronic device 40. Consequently, because the power supply to the tap 330 can be automatically controlled, it is possible to efficiently control power to the device 70 connected to the tap 330.

Figure 4:
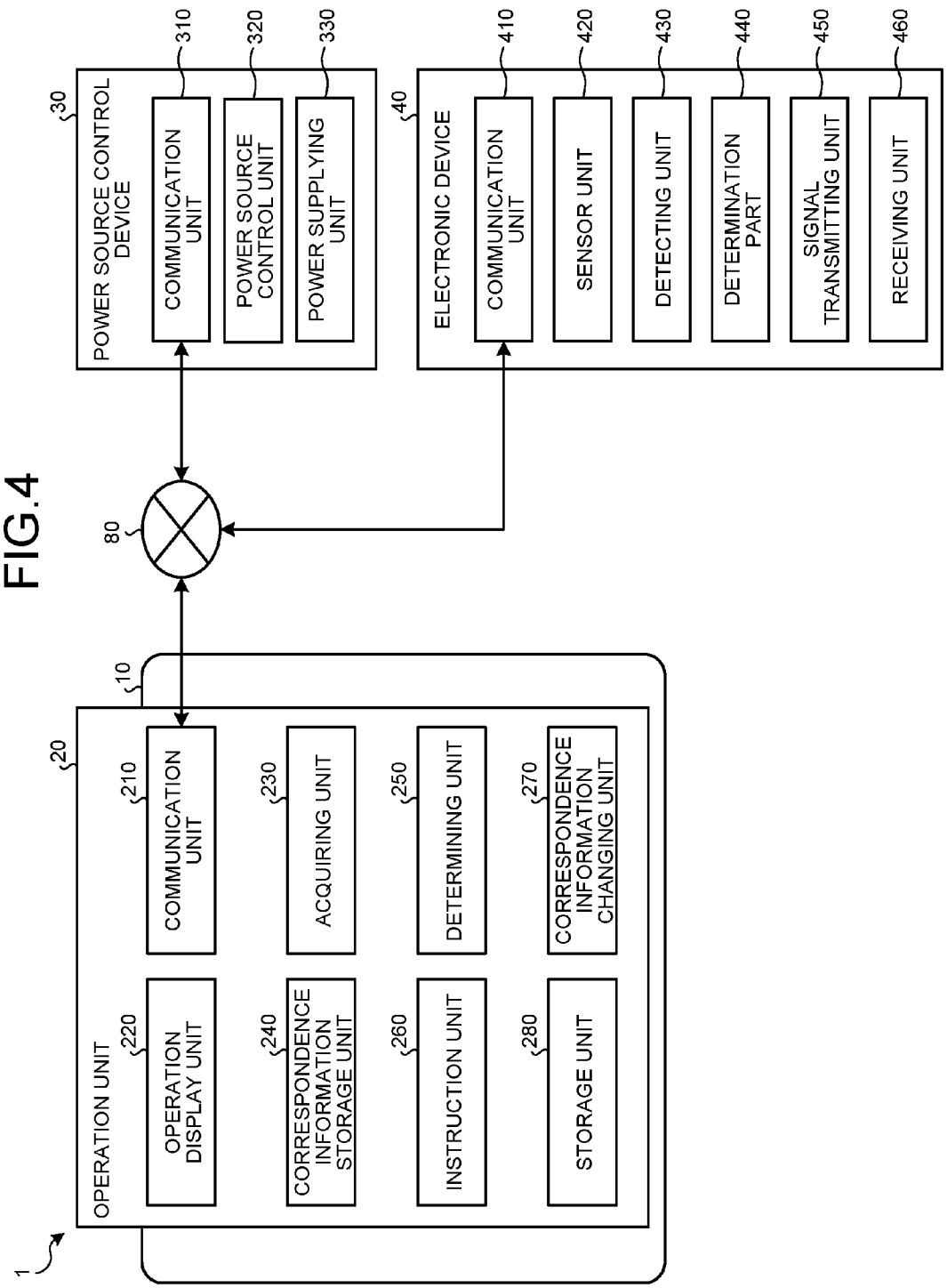
FIG. 4 is a block diagram illustrating an example of a functional configuration of an image processing device, a power source control device, and an electronic device according to the first embodiment.

With reference to FIG. 4, the functions of the image processing device 1, the power source control device 30, and the electronic device 40 will now be described. FIG. 4 is a block diagram illustrating an example of a functional configuration of an image processing device, a power source control device, and an electronic device. A sensor unit 420 included in the electronic device 40 corresponds to the "detector" in the claims, and hereinafter, a "sensor unit" is also referred to as a "sensor".

The functional configuration of the image processing device 1 will now be described. As illustrated in FIG. 4, the operation unit 20 includes a communication unit 210, an operation display unit 220, an acquiring unit 230, a correspondence information storage unit 240, a determining unit 250, an instruction unit 260, a correspondence information changing unit 270, and a storage unit 280. A part of each of the units described above may be software (a computer program), or a part or the whole thereof may be a hardware circuit. A part of each of the units described above may also be mounted on the main body 10.

The communication unit 210 communicates with the power source control device 30, and transmits and receives information (output signal from the sensor 420) to control the power source control device 30 that supplies power to each device 70, to supply power and to shut off power supply to each device 70 from the power supplying unit 330. The communication unit 210 also receives and transmits information to control power to each device 70, the energized state, information on the power consumption amount of each device 70, and the like. The communication unit 210 also communicates with the electronic device 40, and receives first correspondence information in which the output signal from the sensor 420 included in an electronic device 40 is associated with the identification information of the electronic device 40. The communication unit 210 also has a function to communicate with the device 70.

The operation display unit 220 displays various types of information, and receives an input made in a user operation. For example, the operation display unit 220 displays an image to control power to the power supplying unit 330 of the power source control device 30 and each device 70, an image including the power consumption amount of each device 70, and the like. The operation display unit 220 also receives an input made in a user operation to apply power or to shut off power to each device 70, a user operation to obtain the power consumption amount of each device 70, and the like. In the present embodiment, the operation display unit 220 has both functions of a "receiving unit" and a "display unit". However, it is not limited thereto, and the function to receive an input made in a user operation (corresponding to the "receiving unit") and the function to display various types of information (corresponding to the "display unit") may be provided separately.

With reference to FIG. 5, a display screen of the operation display unit 220 will now be described. FIG. 5 is a diagram illustrating an example of a display screen showing the status of a plurality of taps of whether power is applied or power is shut off. Here, a single power source control device 30 has a plurality of taps 330. However, it is not limited thereto, and for example, each of a plurality of power source control devices 30 may have a single tap 330. Here, a single tap 330 has a plurality of outlets. However, it is not limited thereto, and a single tap 330 may have a single outlet. In the example illustrated in FIG. 5, the power source control device 30 includes five taps 330 that are identified by a "tap A01", a "tap A02", a "tap A03", a "tap A04", and a "tap A05". Each of the taps 330 has four outlets identified by an "outlet #1", an "outlet #2", an "outlet #3", and an "outlet #4". In the example illustrated in FIG. 5, a combination of a tap 330 and an outlet is information that specifies the device 70 connected to the outlet included in the combination.

As illustrated in FIG. 5, on the display screen of the operation display unit 220, the energized state of the corresponding device 70 is displayed for each combination of the tap 330 and the outlet. In the example illustrated in FIG. 5, the device 70 corresponding to the combination of the "tap A01" and the "outlet #1", in other words, the device 70 connected to the "outlet #1" of the "tap A01" is "energized (turned on)". The device 70 corresponding to the combination of the "tap A03" and the "outlet #1", in other words, the device 70 connected to the "outlet #1" of the "tap A03" is "shut off (turned off)". A "latest acquisition" button is arranged on the display screen. The "latest acquisition" button is a button for updating the latest energized state. If the "latest acquisition" button is pressed in a user operation, the acquiring unit 230, which will be described later, acquires the energized state of the power source control device 30, and the acquired energized state is displayed on the screen.

With the display screen illustrated in FIG. 5, for example, it is also possible to receive a user operation to apply power or to shut off power to each device 70. For example, if a user presses an image, on which "energized (turned on)" is displayed, the operation display unit 220 receives an input to shut off power to the corresponding device 70. In other words, the operation display unit 220 receives a user operation to shut off power to the device 70. On the other hand, for example, if a user presses an image, on which "shut off (turned off)" is displayed, the operation display unit 220 receives an instruction input to apply power to the corresponding device 70. In other words, the operation display unit 220 receives a user operation to apply power to the device 70.

Returning to FIG. 4, the description will be continued. The acquiring unit 230 acquires the first correspondence information in which the output signal from the sensor 420 provided in an electronic device 40 is associated with the identification information of the electronic device 40, from the electronic device 40, which will be described later, via the communication unit 210. The acquiring unit 230 acquires the first correspondence information in which the output signal from the sensor 420 provided in the electronic device 40 is associated with the identification information of the electronic device 40, from the electronic device 40 at a predetermined interval. The predetermined interval can be set optionally. The acquiring unit 230 acquires the first correspondence information in which the output signal from the sensor 420 detected by a detecting unit 430 of the electronic device 40, which will be described later, is associated with the identification information of the electronic device 40.

Hereinafter, the "identification information of the electronic device" may be referred to as "electronic device identification (ID)". The acquiring unit 230 delivers the obtained first correspondence information to the storage unit 280 for storage. The sensor 420 included in the electronic device 40 is not limited to one, but may be plural.

Hereinafter, an "illuminance sensor" is used as an example of the sensor 420 included in the electronic device 40. However, it is not limited thereto, and in the present embodiment, any sensor 420 such as a motion sensor (human body detecting sensor) that can detect the presence of human and the like may be used as the sensor 420 to detect the human presence. The motion sensor (human body detecting sensor) includes a pyroelectric sensor, and an ultrasonic sensor. Examples of the output signal include an electrical signal (analog signal and digital signal), current, and voltage. In the present embodiment, illumination "lux", which is obtained by converting the above, is used as an example of the output signal (detection value). A method to convert the current, voltage, or the like to "lux" is optional.

Examples of the identification information of the electronic device 40 include an Internet Protocol (IP) address, a media access control (MAC) address, a model, a model number, a machine type, and the electronic device ID. However, the identification information may be any information that can specify the electronic device 40.

The first correspondence information will now be described with reference to FIG. 6. FIG. 6 is a diagram illustrating an example of the first correspondence information. In the example illustrated in FIG. 6, the output signal of the sensor 420 corresponding to the electronic device ID "0001", is "13" (lux). The output signal of the sensor 420 corresponding to the electronic device ID "0002", is "400" (lux). The output signal of the sensor 420 corresponding to the electronic device ID "0003", is "0" (lux). The output signal of the sensor 420 corresponding to the electronic device ID "0004", is "30" (lux). The output signal of the sensor 420 corresponding to the electronic device ID "0005", is "1000" (lux). The output signal "lux" described above is an example, and current or voltage may also be used.

The acquiring unit 230 also delivers the first correspondence information, in which the acquired output signal is associated with the identification information of the electronic device 40, to the correspondence information storage unit 240 and the determining unit 250, which will be described later.

The acquiring unit 230 also acquires information, for example, on the power consumption of the device 70, via the communication unit 210. More specifically, the acquiring unit 230 acquires the power consumption amount of each device 70 from the power source control device 30, via the communication unit 210. The acquiring unit 230 also acquires the energized state of power of the power source control device 30. The power consumption amount can be acquired, for example, on a regular basis, or when a user operation to acquire the power consumption amount is performed on the operation display unit 220. The acquired power consumption amount may be accumulated in memory and/or may be used as information to be displayed on the operation display unit 220.

With reference to FIG. 7, an example of a display screen will now be described. FIG. 7 is a diagram illustrating an example of a display screen showing a power consumption status at an instance. In the example illustrated in FIG. 7, the power consumption of the device 70 connected to the "outlet #1" of the "tap A01" is "100 watts". The power consumption of the device 70 connected to the "outlet #2" of the "tap A01" is "20 watts". With respect to the "outlet #1" of the "tap A03" and the "outlet #1" of the "tap A05", either power is shut off or the device 70 is not connected and thus the power consumptions are both "0 watt". On the display screen, a "latest acquisition" button is arranged. The "latest acquisition" button is a button for updating the latest power consumption status. If the "latest acquisition" button is pressed in a user operation, the acquiring unit 230 acquires the power consumption amount of each device 70, and the acquired power consumption amounts are displayed on the screen.

Returning to FIG. 4, the description will be continued. The correspondence information storage unit 240 stores therein second correspondence information in which identification information (tap ID) to identify the power supplying unit 330 that supplies power to the device 70 is associated with identification information (electronic device ID) to identify each electronic device 40.

With reference to FIG. 8, the second correspondence information will now be described. FIG. 8 is a diagram illustrating an example of the second correspondence information. The example illustrated in FIG. 8 depicts the tap ID associated with the electronic device ID, in addition to the outlet ID linked with the tap ID. In other words, FIG. 8 illustrates an example of the second correspondence information in which the tap ID and the outlet ID are associated with each electronic device ID. However, it is not limited thereto, and in the second correspondence information, at least the tap ID is associated with each electronic device ID, and other information to be associated is optional.

In the example illustrated in FIG. 8, as the second correspondence information, for example, the tap ID "A01" is associated with the electronic device ID "0001", and the tap A01 is linked with four outlets with outlet IDs "#1", "#2", "#3", and "#4". Similarly, for example, the tap ID "A02" is associated with the electronic device ID "0002", and the tap A02 is linked with four outlets with the outlet IDs "#1", "#2", "#3", and "#4". Also, for example, the tap ID "A03" is associated with the electronic device ID "0003", and the tap A03 is linked with four outlets with the outlet IDs "#1", "#2", "#3", and "#4". Furthermore, for example, the tap ID "A04" is associated with the electronic device ID "0004", and the tap A04 is linked with four outlets with the outlet IDs "#1", "#2", "#3", and "#4". Furthermore, for example, the tap ID "A05" is associated with the electronic device ID "0005", and the tap A05 is linked with four outlets with the outlet IDs "#1", "#2", "#3", and "#4".

In this manner, the correspondence information storage unit 240 stores therein the second correspondence information in which the identification information (tap ID) to identify the power supplying unit 330 that supplies power to the device 70, is associated with identification information (electronic device ID) to identify each electronic device 40. In the example illustrated in FIG. 8, in the second correspondence information, for example, single tap ID "A01" is associated with the electronic device ID "0001". However, it is not limited thereto, and for example, a plurality of tap IDs of "A01" and "A02" may be associated with the electronic device ID "0001".

The number of the device 70 to be connected to the tap 330 is equal to or more than one, and for example, a plurality of devices 70 may be linked with a single tap 330. The correspondence information storage unit 240 may also include, for example, a correspondence information database in which the second correspondence information is stored.

The second correspondence information is set in advance, when a specific user operates the display screen of the operation display unit 220 to input the second correspondence information. The specific user, for example, is a manager who manages the power source. The user can also change the setting of the second correspondence information from the operation display unit 220 as necessary. The second correspondence information can be changed and updated at will with the function of the correspondence information changing unit 270, which will be described later.

In the present embodiment, when the correspondence information database is included, the correspondence information storage unit 240 includes the correspondence information database in which the second correspondence information is stored. However, it is not limited thereto, and the correspondence information database may be a separate correspondence information database connected to the network 80, or may be included in an external device (such as a server device) connected to the network 80.

Returning to FIG. 4, the description will be continued. The determining unit 250 determines whether to supply power to the device 70 from the power supplying unit 330, based on the first correspondence information (electronic device ID and output signal) described with reference to FIG. 6, and the second correspondence information (electronic device ID and tap ID) described with reference to FIG. 8. In other words, the determining unit 250 determines whether to supply power or to shut off power supply to the device 70 from the power supplying unit 330.

The determining unit 250, if the output signal from the sensor 420 detected by the detecting unit 430 is judged to be equal to or less than a predetermined threshold, determines to shut off power supply to the device 70 from the power supplying unit (tap) 330. If the output signal from the sensor 420 detected by the detecting unit 430 is judged to exceed the threshold, the determining unit 250 determines to supply power to the device 70 from the power supplying unit 330. The threshold to be set, for example, is between 0 lux and 1000 lux, preferably between 10 lux and 300 lux, more preferably between 10 lux and 100 lux, further preferably between 10 lux and 30 lux, and most preferably 13 lux. As a guide, for example, the brightness under a streetlight is about between 50 and 100 lux, the brightness in a bedroom is about 30 lux, and the brightness of a candle flame is about 10 lux. By setting the most preferable threshold, for example, to 13 lux, it is possible to judge, for example, whether the surroundings have become dark or the surroundings have become bright. The threshold of the output signal to be set is optional.

The determining unit 250, for example, by referring to the electronic device ID "0001" illustrated in FIG. 6, judges that the power supplying unit 330 associated with the electronic device ID "0001" illustrated in FIG. 8 is the tap ID "A01". In other words, the determining unit 250, based on the electronic device ID "0001" included in the first correspondence information acquired by the acquiring unit 230, judges that the power supplying unit 330 to be controlled is the tap ID "A01". Then, the determining unit 250, based on the output signal "13" lux of the sensor 420 in the electronic device ID "0001" included in the first correspondence information acquired by the acquiring unit 230 illustrated in FIG. 6, determines to supply power and to shut off power supply to the device 70 from the tap ID "A01".

In other words, if the output signal "13" lux of the sensor 420 in the electronic device ID "0001" is judged to be equal to or less than a predetermined threshold, the determining unit 250 determines to shut off power supply to the device 70 from the power supplying unit 330. If the output signal "13" lux of the sensor 420 is judged to exceed the predetermined threshold, the determining unit 250 determines to supply power to the device 70 from the power supplying unit 330.

More specifically, as described above, if the most preferable threshold is set to 13 lux, for example, and if the output signal of the sensor 420 in the electronic device ID "0001" is judged to be equal to or less than "13" lux (the surroundings have become dark), the determining unit 250 shuts off the power supply to the device 70 from the power supplying unit 330. If the output signal of the sensor 420 is judged to exceed "13" lux (the surroundings have become bright), the determining unit 250 supplies power to the device 70 from the power supplying unit 330. Thus, based on the illumination information of the floor where the electronic device 40 is installed, it is possible to automatically and efficiently control the supply of power to the device 70 from the power supplying unit 330.

A plurality of sensors 420 may be provided in the electronic device 40. For example, when a "motion sensor", which will be described later, is further provided, the determining unit 250 determines to shut off power supply to the device 70 from the power supplying unit 330, if the output signal of the sensor 420 in the electronic device ID "0001" is judged to be equal to or less than "13" lux (the surroundings have become dark), and also if the output signal of the motion sensor is equal to or less than a predetermined threshold (there is no one around the electronic device 40). The determining unit 250 determines to supply power to the device 70 from the power supplying unit 330, if the output signal of the sensor 420 in the electronic device ID "0001" is judged to be equal to or less than a threshold (the surroundings have become dark), but if the output signal of the motion sensor exceeds the threshold (there is someone around the electronic device 40).

Similarly, when a sound sensor, which will be described later, is provided, the determining unit 250 determines to shut off power supply to the device 70 from the power supplying unit 330, if the output signal from the sound sensor is judged to be equal to or less than a predetermined threshold (the surroundings are quiet). The determining unit 250 determines to supply power to the device 70 from the power supplying unit 330, if the output signal from the sound sensor is judged to exceed the predetermined threshold (the surroundings are noisy).

When a temperature sensor, which will be described later, is provided, the determining unit 250 determines to shut off power supply to the device 70 from the power supplying unit 330, if the output signal from the temperature sensor is judged to be equal to or less than a predetermined threshold (low room temperature, for example, heater is not used). The determining unit 250 also determines to supply power to the device 70 from the power supplying unit 330, if the output signal from the temperature sensor is judged to exceed the predetermined threshold (high room temperature, for example, heater is used).

The determining unit 250 also delivers the determination result to the storage unit 280, which will be described later, for storage.

If the time during which the output signal from the sensor 420 detected by the detecting unit 430 is equal to or less than a predetermined threshold is judged to be equal to or longer than a predetermined time, the determining unit 250 determines to shut off power supply to the device 70 from the power supplying unit 330. If the time during which the output signal from the sensor 420 detected by the detecting unit 430 exceeds the predetermined threshold is judged to be equal to or longer than the predetermined time, the determining unit 250 determines to supply power to the device 70 from the power supplying unit 330. The time to be set, for example, is 120 minutes, preferably 60 minutes, more preferably 30 minutes, further preferably 5 minutes, and most preferably 1 minute. Time can be set optionally.

The determining unit 250 of the image processing device 1 determines (confirms) whether the output signal from the sensor 420 is equal to or less than the predetermined threshold, and then determines to shut off power supply to the device 70 from the power supplying unit 330, when the power control system 100 has a configuration in which a signal transmitting unit 450 transmits the first correspondence information in which the detected output signal is associated with the identification information of the electronic device 40, when a determination part 440 of the electronic device 40, which will be described later, judges whether the time during which the output signal from the sensor 420 is equal to or less than a predetermined threshold is equal to or longer than a predetermined time, and judges that the time during which the output signal is equal to or less than the predetermined threshold is equal to or longer than the predetermined time. In the configuration described above, whether the output signal from the sensor is equal to or less than a predetermined threshold is judged in the electronic device 40. As a result, it is possible to achieve an advantageous effect that the load on the image processing device 1 can be suppressed.

The determining unit 250 may determine to supply power to the device 70 from the power supplying unit 330 at a predetermined time or predetermined date and time, instead of determining to supply power to the device 70 from the power supplying unit 330, based on the first correspondence information (electronic device ID and output signal) and the second correspondence information (electronic device ID and tap ID). In this configuration, for example, even if the place where the electronic device 40 is installed becomes bright, the power to the device 70 from the power supplying unit 330 can be supplied according to the starting time of work or the office hour. Consequently, it is possible to achieve an advantageous effect that power to the device 70 connected to the power supplying unit (tap) 330 can be further effectively controlled.

With reference to FIG. 9, the determination results of the determining unit 250 will now be described. FIG. 9 is a diagram for explaining the determination results of a determining unit. The example illustrated in FIG. 9 is the determination result when the predetermined threshold is assumed to be, for example, "13" lux. As described above, by referring to the first correspondence information (electronic device ID and output signal) and the second correspondence information (tap ID linked with the electronic device ID) illustrated in FIG. 6 and FIG. 8, the determining unit 250 determines that the output signal "13" lux from the sensor 420 in the electronic device ID "0001" is equal to or less than the threshold assumed above. Consequently, the determining unit 250 determines to shut off power supply to the device 70 at the tap ID "A01". Similarly, because the output signal "400" lux from the sensor 420 in the electronic device ID "0002" exceeds the threshold, the determining unit 250 determines to supply power to the device 70 at the tap ID "A02". Also, because the output signal "0" lux from the sensor 420 in the electronic device ID "0003" is equal to or less than the threshold, the determining unit 250 determines to shut off power supply to the device 70 at the tap ID "A03". Furthermore, because the output signal "30" lux from the sensor 420 in the electronic device ID "0004" exceeds the threshold, the determining unit 250 determines to supply power to the device 70 at the tap ID "A04". Furthermore, because the output signal "1000" lux from the sensor 420 in the electronic device ID "0005" exceeds the threshold, the determining unit 250 determines to supply power to the device 70 at the tap ID "A05". As described above, if the time during which the output signal from the sensor 420 is equal to or less than a predetermined threshold is judged to be equal to or longer than a predetermined time, the determining unit 250 may determine to shut off power supply to the device 70 from the power supplying unit (tap) 330. Also, if the time during which the output signal from the sensor 420 exceeds the threshold is judged to be equal to or longer than a predetermined time, the determining unit 250 may determine to supply power to the device 70 from the power supplying unit (tap) 330.

In this manner, based on the first correspondence information (electronic device ID and output signal) and the second correspondence information (tap ID linked with the electronic device ID), the determining unit 250 determines to supply and to shut off power to the device 70 from the power supplying unit 330.

The determining unit 250 can also determine to supply and to shut off power to the device 70 connected to the respective outlet ID, associated with a corresponding tap ID as illustrated in FIG. 8 described above. In this case, for example, in the example illustrated in FIG. 8, based on the information of the device 70 linked with each outlet ID, the determining unit 250 determines to supply and to shut off power to the device 70 connected to each outlet ID. More specifically, as described above, for example, the output signal of the sensor 420 in the electronic device ID "0001" is "13" lux in the first correspondence information illustrated in FIG. 6. Because this is equal to or less than the threshold assumed in the above, the determining unit 250 determines to shut off power supply to the device 70 at the tap ID "A01" by the second correspondence information illustrated in FIG. 8. In other words, because the outlets #1, #2, and #3 of the tap A01 are being energized on the display screen illustrated in FIG. 5, the determining unit 250 determines to shut off power supply to the outlets #1, #2, and #3 of the tap A01.

In other words, because the output signal "13" lux of the sensor 420 in the electronic device ID "0001" is equal to or less than the threshold, the determining unit 250 determines to shut off power supply to the outlets #1, #2, and #3, which are being energized, of the tap ID "A01" associated with the electronic device ID "0001".

The determining unit 250 may also determine to shut off the power supply, for example, to only a single outlet #1, instead of the three outlets #1, #2, and #3, which are being energized. The determining unit 250 may also determine to shut off the power supply, for example, to two outlets #1 and #2. In this case, the correspondence information storage unit 240 described above may further include power supply correspondence information in which the outlet ID is associated with either "being energized" or "being shut off", for each tap ID. The determining unit 250, based on the power supply correspondence information, then determines to supply and to shut off power to each device 70 connected to the tap ID of the outlet ID, individually.

Similarly, because the output signal "1000" lux of the sensor 420 in the electronic device ID "0005" exceeds the threshold, the determining unit 250 determines to supply power to the outlets #1 and #2, to which the power is currently shut off, of the tap ID "A05" associated with the electronic device ID "0005". Hereinafter, the determining unit 250 performs similar determinations.

The instruction unit 260 performs, according to the determination result of the determining unit 250, control to transmit a command to instruct the power source control device 30 to supply power or to shut off power supply to the device 70 from the power supplying unit 330, via the communication master unit 50. More specifically, the instruction unit 260, for example, if the determining unit 250 determines to supply power to the device 70 through the "tap A01", performs control to transmit an instruction command to supply power, to the power source control device 30 via the communication master unit 50. Also, if the determining unit 250 determines to shut off power supply to the device 70 through the "tap A01", for example, the instruction unit 260 performs control to transmit an instruction command for the power source control device 30 to shut off the power supply, via the communication master unit 50.

In the case where the determining unit 250 described above determines to supply power and to shut off power supply to the device 70 from the tap 330 to be controlled, the subject to instruct the power source control device 30 to supply power or to shut off power supply to the device 70 from the tap 330 to be controlled is not limited to the instruction unit 260, and may be, for example, the determining unit 250. Alternatively a function may be provided to control the transmission of the instruction command for the power source control device 30 to supply power or to shut off the power supply to the device 70 from the tap 330 to be controlled, via the communication master unit 50, instead of the instruction unit 260.

The correspondence information changing unit 270 changes and updates the second correspondence information, and stores it in the correspondence information storage unit 240. More specifically, the correspondence information changing unit 270 changes, for example, the tap ID "A01" associated with the electronic device ID "0001" to the tap ID "A02", in the second correspondence information described with reference to FIG. 8, updates the second correspondence information, and stores it in the correspondence information storage unit 240. The tap ID associated with the electronic device ID is optional, and the linkage relation between the electronic device ID and the tap ID may be optionally set and changed. The changing operation of the second correspondence information may also be received and carried out by the operation display unit 220. For example, the operation display unit 220 may be used to call the function of the correspondence information changing unit 270. By inputting any electronic device ID and then inputting any associating tap ID, the tap ID associated with the electronic device ID can be set and changed.

The storage unit 280 stores therein the first correspondence information. More specifically, the storage unit 280 stores therein the first correspondence information, in which the output signal from the sensor 420 included in the electronic device 40 is associated with the identification information of the electronic device 40, explained with reference to FIG. 6 described above.

The storage unit 280 also stores therein the determination results of the determining unit 250 explained with reference to FIG. 9.

Next, the functional configuration of the power source control device 30 will now be described. As illustrated in FIG. 4, the power source control device 30 includes a communication unit 310, a power source control unit 320, and the power supplying unit 330. The communication unit 310 communicates with the image processing device 1 connected to the network 80. More specifically, the communication unit 310 communicates with the image processing device 1, and transmits and receives information on the power consumption amount of each device 70, the energized state, information to control power to each device 70, information to control the power supply or shutting off of the power supply to the device 70 from the power supplying unit 330, and the like. As described above, the information on the power consumption amount of each device 70 or the energized state is transmitted on a regular basis, or transmitted according to a request.

The power source control unit 320 performs control to supply power and to shut off power supply to the device 70 from the power supplying unit 330, according to an instruction from the instruction unit 260 of the image processing device 1. More specifically, the power source control unit 320 performs, upon receiving an instruction to supply power or to shut off power supply to the device 70 from the power supplying unit 330 via the communication unit 310, control to supply power and to shut off power supply to the device 70 from the power supplying unit 330.

The power source control unit 320 can also control the application of power or shutting off of power to the device 70. More specifically, the power source control unit 320, upon receiving an instruction to apply power or to shut off power from the image processing device 1 via the communication unit 310, controls the application of power or shutting off of power to the corresponding outlet. The power supplying unit 330 supplies power to the connected device 70. More specifically, the device 70 is connected to the power supplying unit (tap) 330, and the power supplying unit 330 supplies power to the connected device 70 under the control of the power source control unit 320. The power supplying unit 330 also shuts off the power supply to the connected device 70 under the control of the power source control unit 320.

The functional configuration of the electronic device 40 will now be described. As illustrated in FIG. 4, the electronic device 40 includes a communication unit 410, the sensor unit 420, the detecting unit 430, the determination part 440, the signal transmitting unit 450, and a receiving unit 460. Hereinafter, the "sensor unit" may also be referred to as the "sensor".

The communication unit 410 communicates with the image processing device 1 connected to the network 80. More specifically, the communication unit 410 communicates with the image processing device 1, and transmits the first correspondence information in which the output signal from the sensor 420 provided in the electronic device 40 is associated with the identification information of the electronic device 40.

The sensor unit 420 is a sensor (detector) 420 provided in the electronic device 40. The sensor 420 included in the electronic device 40, for example, may be an illuminance sensor that can detect the surrounding brightness. Examples of the types of the illuminance sensor include a phototransistor illuminance sensor, a photodiode illuminance sensor, and a photodiode illuminance sensor in which an amplifier circuit is added. Other examples of the sensor 420 that detects light include an optical sensor, a photoelectric sensor, a photomultiplier tube, a charge-coupled device (CCD) image sensor, a complementary metal-oxide semiconductor (CMOS) image sensor, and a photothyristor.

The sensor 420 to be applied in the present embodiment may be the sensor 420 that detects sound, temperature, human presence, or the like other than light. Examples of the sensor 420 that detects sound include, for example, a microphone and an ultrasonic sensor. Examples of the microphone include an electrodynamic type microphone, an electrostatic type microphone, and a piezoelectric type microphone that have different conversion methods. Examples of the sensor 420 that detects temperature include a thermal type sensor and a quantum type sensor. The thermal type sensor includes a thermopile and a thermistor that use the change in temperature of a sensor element when infrared rays are received. The quantum type sensor includes a photodiode and a phototransistor that use the change in the sensor element when photons are received. Examples of the motion sensor that detects human presence include a pyroelectric sensor, an infrared ray sensor, an ultrasonic sensor, and a visible light sensor.

In the present embodiment, for example, the "illuminance sensor" is used as the sensor 420 provided in the electronic device 40. However, it is not limited thereto, and the illuminance sensor, the motion sensor, the sound sensor, the temperature sensor, and the like described above may be used separately or in combination, or all of the sensors 420 may be provided.

The detecting unit 430 detects the output signal from the sensor 420. Examples of the output signal from the sensor 420 include an electrical signal (analogue signal and digital signal), current, and voltage. In the present embodiment, for example, illumination "lux" is used as an example of the output signal (detection value), which is obtained by converting them.

The detecting unit 430 detects the output signal from the sensor 420 at a predetermined interval. The predetermined interval can be set optionally.

The determination part 440 judges whether the time during which the output signal from the sensor 420 detected by the detecting unit 430 is equal to or less than a predetermined threshold is equal to or longer than a predetermined time. The threshold to be set, for example, is between 0 lux and 1000 lux, preferably between 10 lux and 300 lux, more preferably between 10 lux and 100 lux, further preferably between 10 lux and 30 lux, and most preferably 13 lux. As a guide, for example, the brightness under a streetlight is about between 50 and 100 lux, the brightness in a bedroom is about 30 lux, and the brightness of a candle flame is about 10 lux. By setting the threshold to 13 lux, it is possible to judge that the surroundings have become dark. The threshold of the output signal to be set is optional. The time to be set, for example, is 120 minutes, preferably 60 minutes, more preferably 30 minutes, further preferably 5 minutes, and most preferably 1 minute. Time can be set optionally.

The signal transmitting unit 450 transmits the first correspondence information in which the output signal from the sensor 420 detected by the detecting unit 430 is associated with the identification information of the electronic device 40. The signal transmitting unit 450 transmits the first correspondence information in which the output signal detected by the detecting unit 430 at a predetermined interval is associated with the identification information of the electronic device 40, to the image processing device 1. The predetermined interval can be set optionally.

The signal transmitting unit 450, if the determination part 440 judges that the time during which the output signal detected by the detecting unit 430 is equal to or less than a predetermined threshold is equal to or longer than a predetermined time, transmits the first correspondence information in which the output signal detected by the detecting unit 430 is associated with the identification information of the electronic device 40. The threshold to be set, and the time to be set are as described at the determining unit 250 of the image processing device 1 described above.

The receiving unit 460 receives an input through a user operation. For example, the receiving unit 460 receives a user operation on various settings of the electronic device 40. The receiving unit 460, for example, is a liquid crystal display device (liquid crystal display panel), and various settings may be input, when a user presses the display screen. The receiving unit 460 is configured of a liquid crystal display (LCD) having a touch panel function. However, it is not limited thereto. For example, the receiving unit 460 may be configured of an organic electroluminescence (EL) display device having a touch panel function. In addition to this, or alternatively, an operation unit such as a hardware key and a display unit such as a lamp may also be provided.

Figure 10:
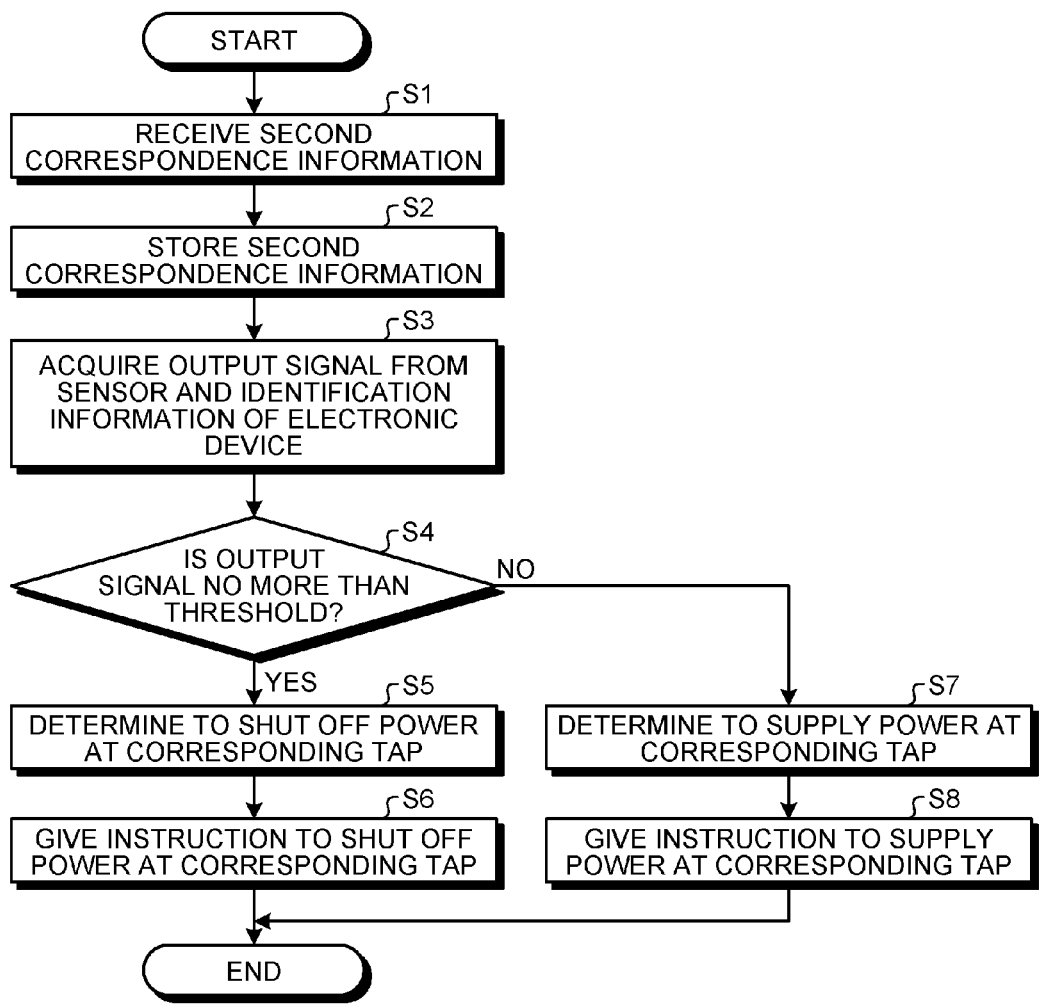
FIG. 10 is a flowchart illustrating an example of a processing operation performed by an image processing device loaded with a power management app.

With reference to FIG. 10, a processing operation performed by the image processing device 1 loaded with the power management app described above will now be explained. FIG. 10 is a flowchart illustrating an example of a processing operation performed by an image processing device loaded with a power management app.

The image processing device 1 first receives the second correspondence information in which the identification information to identify the power supplying unit 330 of the power source control device 30 that supplies power to the device 70 is associated with identification information of each electronic device 40, via the operation display unit 220 (step S1). Then, the image processing device 1 stores the second correspondence information in the correspondence information storage unit 240 (step S2). Next, the image processing device 1 acquires the first correspondence information in which the output signal from the sensor 420 provided in the electronic device 40 is associated with the identification information of the electronic device 40 (step S3). The image processing device 1 then judges whether the output signal acquired from the sensor 420 is equal to or less than a predetermined threshold (step S4). If it is equal to or less than the threshold (Yes at step S4), the image processing device 1, based on the first correspondence information and the second correspondence information, determines to shut off power supply to the device 70 from the power supplying unit (tap) 330 to be controlled (step S5). The image processing device 1 then instructs the power source control device 30 to shut off power supply to the device 70 from the power supplying unit 330 to be controlled (step S6), and completes the processing.

Returning to step S4, if it is not equal to or less than the threshold (No at step S4), the image processing device 1, based on the first correspondence information and the second correspondence information, determines to supply power to the device 70 from the power supplying unit 330 to be controlled (step S7). Then, the image processing device 1 instructs the power source control device 30 to supply power to the device 70 from the power supplying unit 330 to be controlled (step S8), and completes the processing.

Figure 11:
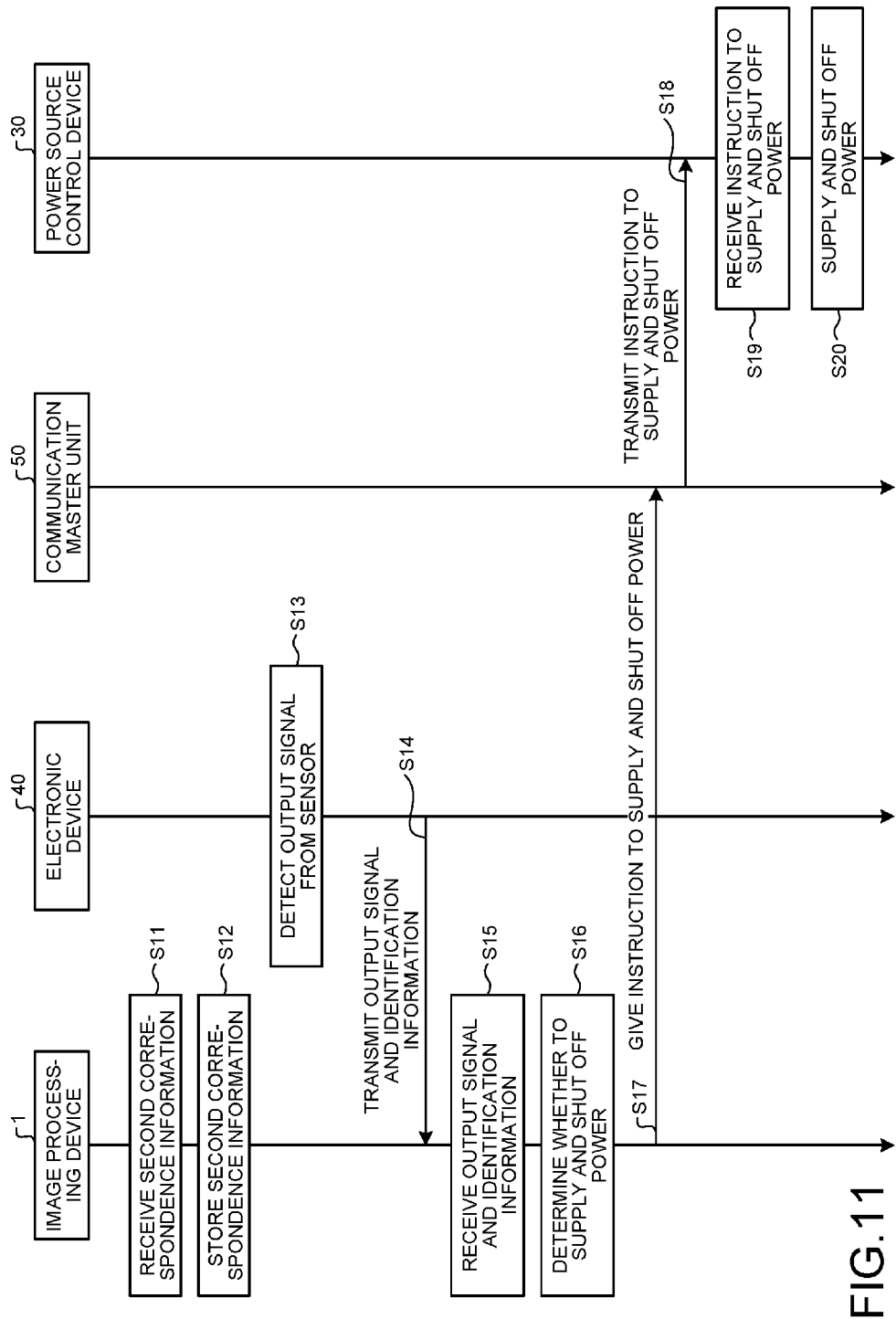
FIG. 11 is a sequence diagram for explaining an example of a processing operation performed by a power control system.

With reference to FIG. 11, a processing operation performed by the power control system 100 will now be described. FIG. 11 is a sequence diagram for explaining an example of a processing operation performed by a power control system.

The image processing device 1 first receives the second correspondence information in which the identification information to identify the power supplying unit 330 of the power source control device 30 that supplies power to the device 70 is associated with identification information of each electronic device 40, via the operation display unit 220 (step S11). The image processing device 1 then stores the second correspondence information in the correspondence information storage unit 240 (step S12).

Next, the electronic device 40 detects the output signal from the sensor 420 provided therein by the detecting unit 430 (step S13). The electronic device 40 then transmits the first correspondence information in which the output signal from the sensor 420 detected by the detecting unit 430 is associated with the identification information of the electronic device 40 (step S14).

Next, the image processing device 1 receives and acquires the first correspondence information in which the output signal from the sensor 420 provided in the electronic device 40 is associated with the identification information of the electronic device 40, from the electronic device 40 (step S15). The image processing device 1, based on the first correspondence information (electronic device ID and output signal) and the second correspondence information (electronic device ID and tap ID), then determines whether to supply power to the device 70 from the power supplying unit 330. In other words, the image processing device 1 determines whether to supply power or to shut off power supply to the device 70 from the power supplying unit 330 (step S16). Next, the image processing device 1, depending on the determination result, transmits a command to instruct the power source control device 30 to supply power or to shut off power supply to the device 70 from the power supplying unit 330, to the communication master unit 50 (step S17).

The communication master unit 50 then receives the instruction command to supply power or to shut off the power supply from the image processing device 1, and instructs the power source control device 30 to supply power or to shut off power supply to the device 70 from the power supplying unit 330 (step S18).

The power source control device 30 receives the instruction command to supply power or to shut off power supply to the device 70 from the power supplying unit 330 (step S19), and according to the instruction, supplies power and shuts off power supply to the device 70 from the power supplying unit 330 (step S20).

Figure 12:
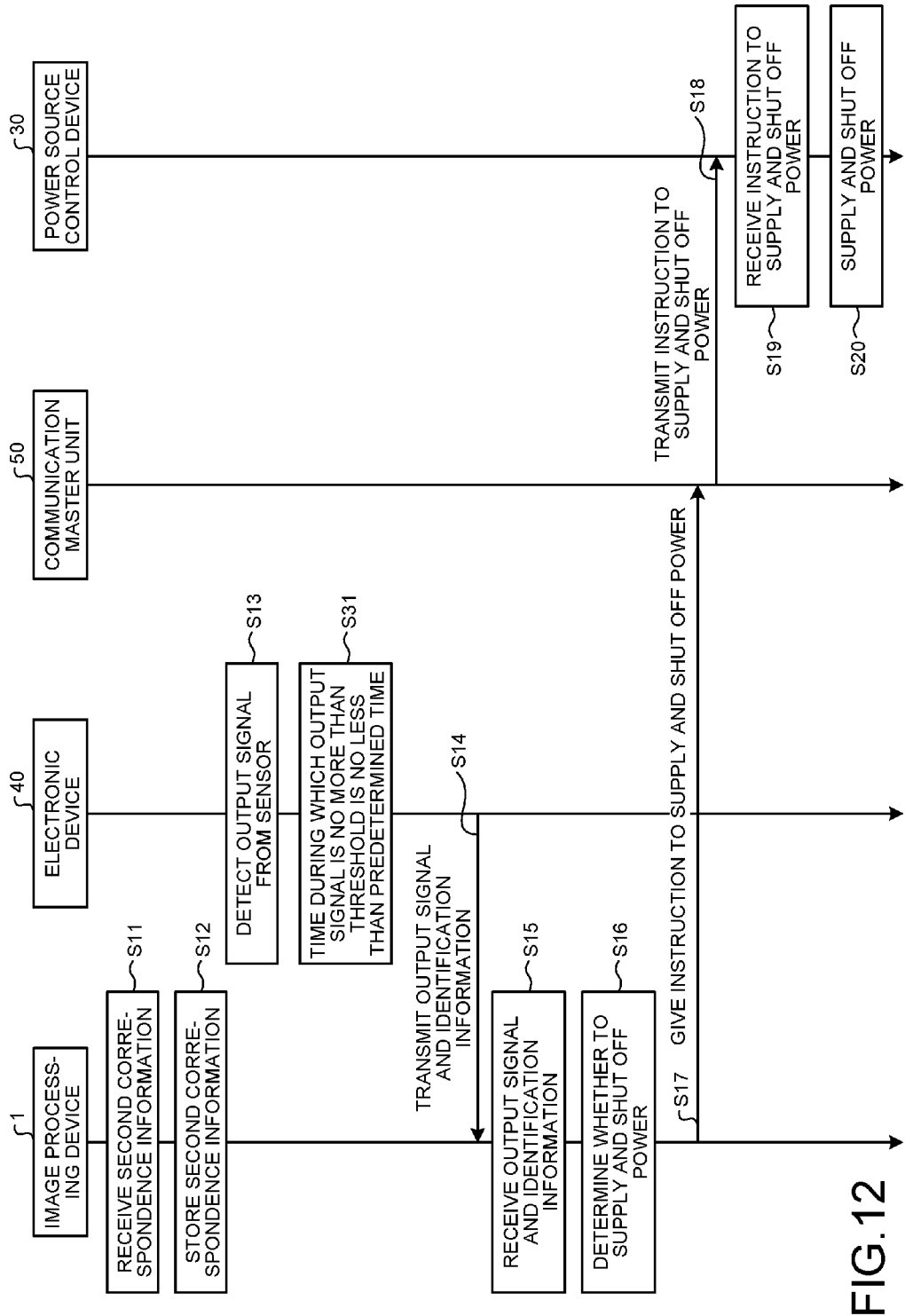
FIG. 12 is a sequence diagram for explaining an example of another processing operation performed by the power control system.

With reference to FIG. 12, another processing operation performed by the power control system 100 will now be described. FIG. 12 is a sequence diagram for explaining an example of another processing operation performed by the power control system. The same reference numerals are given to the similar steps explained with reference to FIG. 11, and the descriptions thereof will be omitted. More specifically, the contents from step S11 to step S20 illustrated in FIG. 12 are the same as the contents from step S11 to step S20 illustrated in FIG. 11 (However, the instruction at step 18 is transmitted to the power source control device 30 and the processes at step S19 and step S20 are executed by the power source control device 30 in FIG. 11, while the instruction at step 18 is transmitted to the power source control device 30*a* and the processes at step S19 and step S20 are executed by the power source control device 30*a* in FIG. 15.). Thus, the only difference is the processing operation at step S31.

The electronic device 40 detects the output signal from the sensor 420 provided therein by the detecting unit 430 (step S13). Next, the electronic device 40 judges whether the time during which the output signal from the sensor 420 detected by the detecting unit 430 is equal to or less than a predetermined threshold is equal to or longer than a predetermined time (step S31). If it is judged to be equal to or longer than the predetermined time, the electronic device 40 transmits the first correspondence information in which the output signal from the sensor 420 detected by the detecting unit 430 is associated with the identification information of the electronic device 40 (step S14). Hereinafter, the processes similar to those in FIG. 11 are performed.

As described above, in the present embodiment, if the power management app is executed, the power control system acquires the first correspondence information in which the output signal from the sensor 420 provided in the electronic device 40 is associated with the identification information of the electronic device 40. Then, based on the first correspondence information (electronic device ID and output signal) and the predetermined second correspondence information (electronic device ID and tap ID), the power control system determines whether to supply power to the device 70 from the power supplying unit (tap) 330. Based on the determination result, the power control system instructs the power source control device 30 to supply power or to shut off power supply to the device 70 from the power supplying unit 330, and according to the instruction, supplies power and shuts off power supply to the device 70 from the power supplying unit 330. In this manner, it is possible to achieve an advantageous effect that power to the device 70 connected to the power supplying unit (tap) 330 can be effectively controlled.

Second Embodiment

A second embodiment will now be described. The power control system according to the second embodiment further includes another image processing device (information processing device) and another power source control device. Hereinafter, detailed descriptions will be given.

Figure 13:
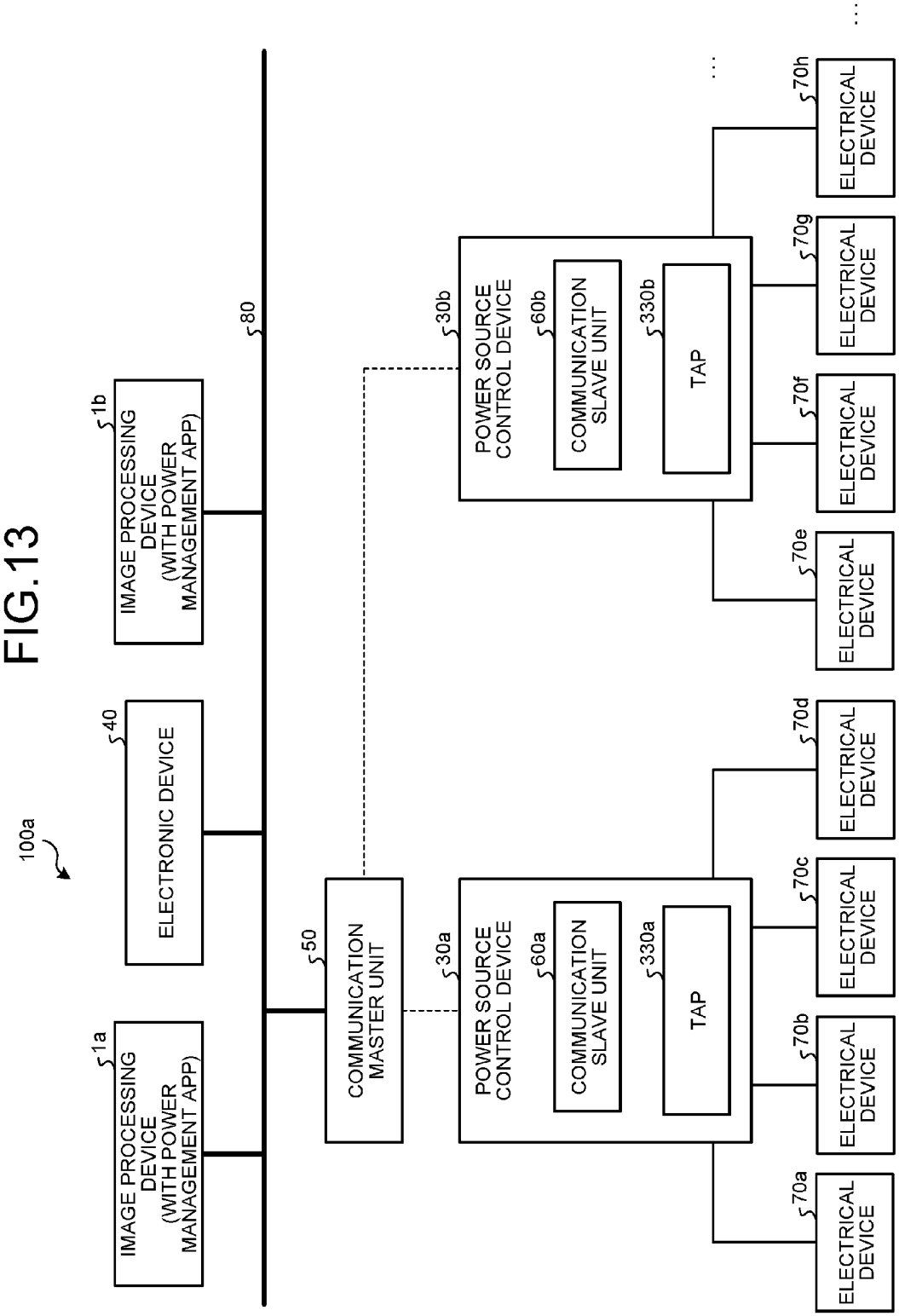
FIG. 13 is a diagram illustrating an example of a system configuration of a power control system according to a second embodiment.

FIG. 13 is a diagram illustrating an example of a system configuration of a power control system according to the second embodiment. In the second embodiment, the same reference numerals are given to the same structural elements as those in the first embodiment, and the description of the same portions as those in the first embodiment described above will be omitted as appropriate.

As illustrated in FIG. 13, a power control system 100*a* includes image processing devices 1*a* and 1*b*, power source control devices 30*a* and 30*b*, the electronic device 40, the communication master unit 50, and electronic devices 70*a* to 70*h*. In the following explanation, if the image processing devices 1*a* and 1*b* need not be differentiated, they are simply referred to as the "image processing device 1". If the power source control devices 30*a* and 30*b* need not be differentiated, they are simply referred to as the "power source control device 30". If the electronic devices 70*a* to 70*h* need not be differentiated, they are simply referred to as the "device 70".

The power source control devices 30*a* and 30*b* include communication slave units 60*a* and 60*b*, and taps 330*a* and 330*b*. In the following explanation, if the communication slave units 60*a* and 60*b* need not be differentiated, they are simply referred to as the "communication slave unit 60". If the taps 330*a* and 330*b* need not be differentiated, they are simply referred to as the "tap 330".

In this example, the image processing devices 1*a* and 1*b* are connected to each of the electronic device 40, the communication master unit 50, the power source control devices 30*a* and 30*b*, and the device 70, via the network 80 such as the LAN. The communication master unit 50 is a master unit, and communicates with the communication slave units 60*a* and 60*b*, which are slave units provided in the power source control devices 30*a* and 30*b*. The communication master unit 50 can communicate with the communication slave units 60*a* and 60*b* in a plurality of power source control devices 30*a* and 30*b*.

As described above, the image processing devices 1*a* and 1*b* are MFPs loaded with a power management app, and by executing the power management app, control power to each device 70 via the power source control devices 30*a* and 30*b*. The electronic device 40 may be configured of, for example, an image processing device provided with the sensor 420.

In FIG. 13, the number of the image processing device 1 and the power source control device 30 is two each. However, it is not limited thereto, and the number of the image processing device 1 and the power source control device 30 is optional. In FIG. 13, the number of the electronic device 40 and the communication master device 50 is one each. However, it is not limited thereto, and the number of the electronic device 40 and the communication master unit 50 is optional. In FIG. 13, the number of the device 70 connected to the tap 330 of the power source control device 30 is four each. However, it is not limited thereto, and the number of the device 70 is optional.

Figure 14:
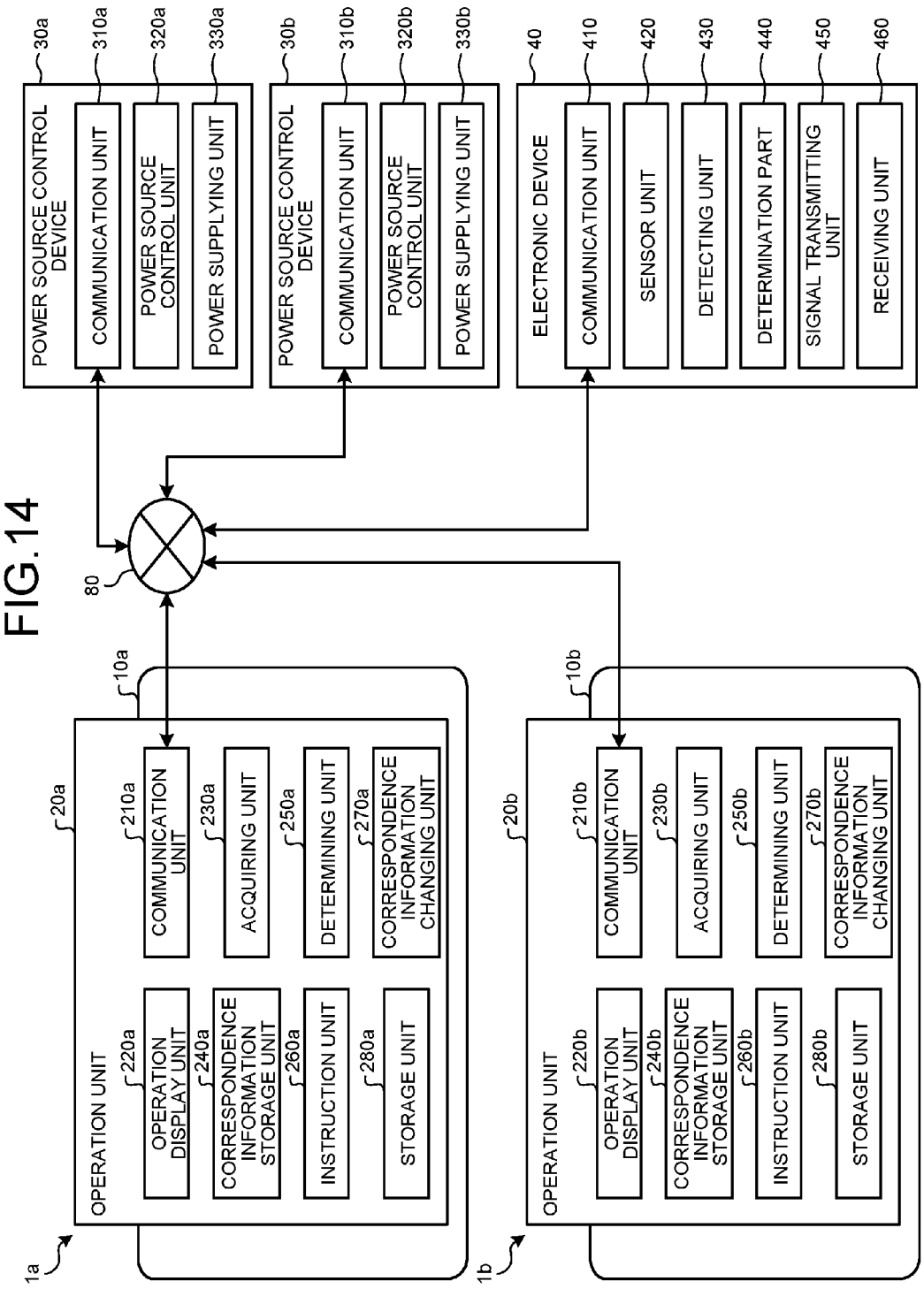
FIG. 14 is a block diagram illustrating an example of a functional configuration of an image processing device, a power source control device, and an electronic device according to the second embodiment.

With reference to FIG. 14, the functions of the image processing devices 1*a* and 1*b*, the power source control devices 30*a* and 30*b*, and the electronic device 40 according to the present embodiment will now be described. FIG. 14 is a block diagram illustrating an example of a functional configuration of an image processing device, a power source control device, and an electronic device according to the second embodiment. In the second embodiment, the same reference numerals are given to the same structural elements as those in the first embodiment, and the descriptions of the same portions as those in the first embodiment described above will be omitted as appropriate.

Based on the first correspondence information (electronic device ID and output signal) explained with reference to FIG. 6 and the second correspondence information (electronic device ID and tap ID) explained with reference to FIG. 8 in the first embodiment, a determining unit 250*a* of the image processing device 1*a* determines whether to supply power to the device 70 from the power supplying unit (tap) 330*a*. In other words, the determining unit 250*a* determines to supply power or to shut off power supply to the device 70 from the power supplying unit 330*a*. The determining unit 250*a* then transmits the determination result and the second correspondence information to another image processing device 1*b*.

The image processing device 1*b* receives the determination result and the second correspondence information from the image processing device 1*a*. Then, based on the determination result of the image processing device 1*a* and the identification information of the electronic device 40 included in the second correspondence information, the image processing device 1*b* instructs another power source control device 30*b* that supplies power to the device 70, to supply power or to shut off power supply to the device 70 from the power supplying unit (tap) 330*b*.

More specifically, if it is judged that the output signal from the sensor 420 included in the first correspondence information (electronic device ID and output signal) is equal to or less than a predetermined threshold, the determining unit 250*a* of the image processing device 1*a* determines to shut off power supply to the device 70 from the power supplying unit 330*a*. If it is judged that the output signal exceeds the threshold, the determining unit 250*a* determines to supply power to the device 70 from the power supplying unit 330*a*. The image processing device 1*a* then transmits the determination result and the second correspondence information (electronic device ID with the sensor 420 and the tap ID) to the image processing device 1*b*.

The image processing device 1*b* receives the determination result and the second correspondence information from the image processing device 1*a*. The image processing device 1*b*, for example, if the determination result is to shut off power supply to the device 70 from the tap ID associated with the electronic device ID, judges that the surroundings of the electronic device 40 with the electronic device ID have become dark and there is no human presence. The image processing device 1*b* then instructs another power source control device 30*b* to shut off power supply to the device 70 from the power supplying unit 330*b*. The power source control device 30*b*, according to the instruction, shuts off power supply to the device 70 from the power supplying unit 330*b*.

Figure 15:
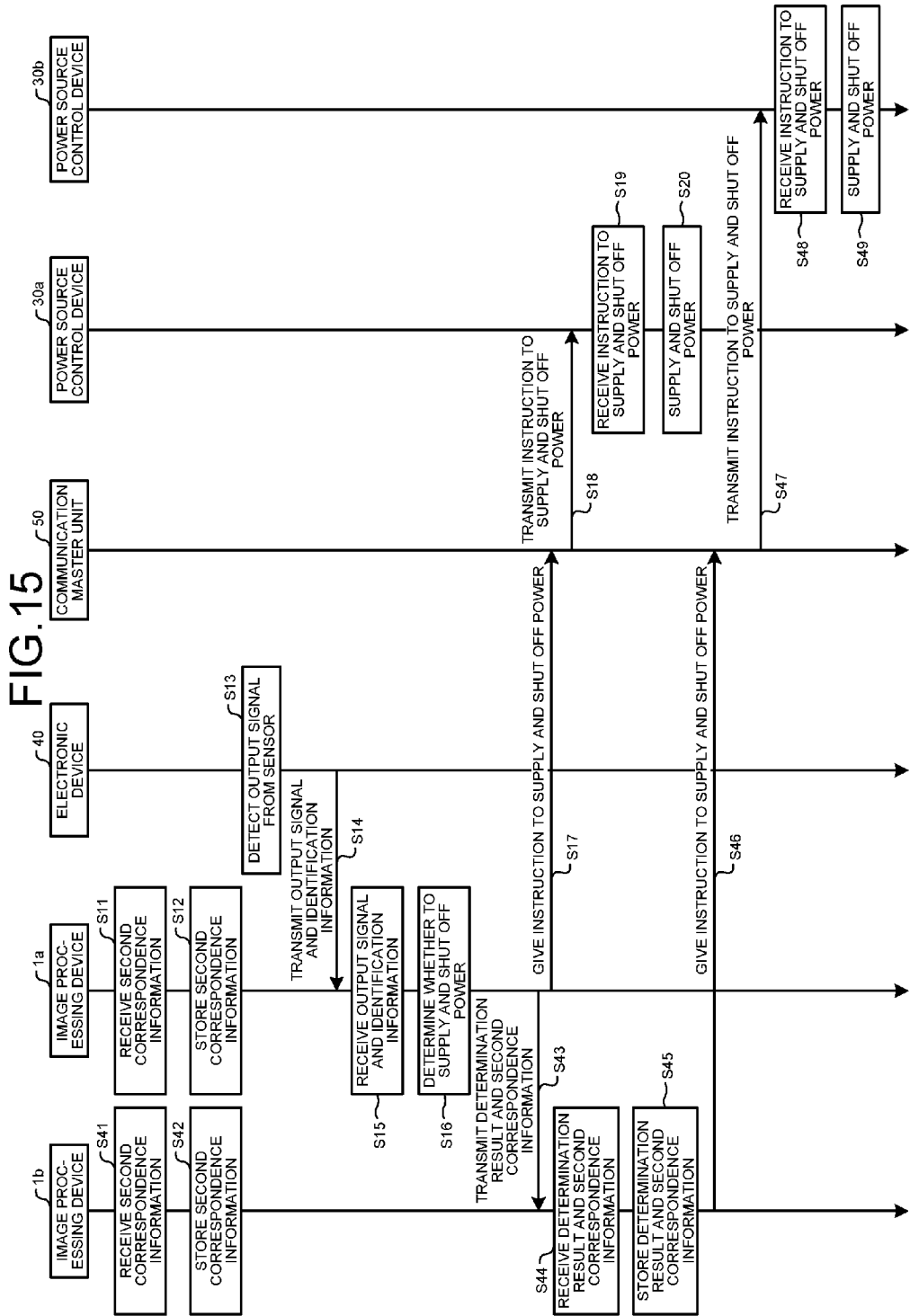
FIG. 15 is a sequence diagram for explaining an example of a processing operation performed by a power control system.

With reference to FIG. 15, a processing operation performed by the power control system 100*a* will now be described. FIG. 15 is a sequence diagram for explaining an example of a processing operation performed by a power control system. The same reference numerals are given to the similar steps explained with reference to FIG. 11, and the descriptions thereof will be omitted. More specifically, the contents from step S11 to step S20 illustrated in FIG. 15 are the same as the contents from step S11 to step S20 illustrated in FIG. 11. Thus, the only difference is the processing operations from steps S41 to S49.

The image processing device 1*b* receives the second correspondence information in which the identification information to identify the power supplying unit 330*b* of the power source control device 30*b* that supplies power to the device 70 is associated with identification information of each electronic device 40, via the operation display unit 220*b* (step S41). The image processing device 1*b* then stores the second correspondence information in a correspondence information storage unit 240*b* (step S42).

The image processing device 1*a* determines to supply power or to shut off power supply to the device 70 from the power supplying unit 330*a* (step S16). Next, the image processing device 1*a* transmits the determination result and the second correspondence information to the image processing device 1*b* (step S43).

The image processing device 1*b* receives the determination result and the second correspondence information from the image processing device 1*a* (step S44), and stores them in a storage unit 280*b* (step S45). The image processing device 1*b*, based on the determination result of the image processing device 1*a* and the identification information of the electronic device 40 included in the second correspondence information, transmits a command to instruct another power source control device 30*b* that supplies power to the device 70, to supply power or to shut off power supply to the device 70 from the power supplying unit 330*b*, to the communication master unit 50 (step S46).

The communication master unit 50 receives the instruction command to supply power or to shut off power supply from the image processing device 1*b*, and transmits an instruction for the power source control device 30*b* to supply power or to shut off power supply to the device 70 from the power supplying unit 330*b* (step S47).

The power source control device 30*b* receives the instruction command to supply power or to shut off power supply to the device 70 from the power supplying unit 330*b* (step S48), and according to the instruction, supplies power and shuts off power supply to the device 70 from the power supplying unit 330*b* (step S49).

As described above, in the present embodiment, if the power management app is executed, the image processing device 1*a* acquires the first correspondence information in which the output signal from the sensor 420 provided in the electronic device 40 is associated with the identification information of the electronic device 40. Then, based on the first correspondence information (electronic device ID and output signal) and the predetermined second correspondence information (electronic device ID and tap ID), the image processing device 1*a* determines whether to supply power to the device 70 from the power supplying unit (tap) 330. The image processing device 1*a* then transmits the determination result and the second correspondence information to another image processing device 1*b*. The other image processing device 1*b*, based on the determination result of the image processing device 1*a* and the identification information of the electronic device 40 included in the second correspondence information, instructs another power source control device 30*b* that supplies power to the device 70, to supply power or to shut off power supply to the device 70 from the power supplying unit 330*b*. The power source control device 30*b*, according to the instruction, supplies power and shuts off power supply to the device 70 from the power supplying unit 330*b*. In this manner, based on the output signal from the sensor 420 in the electronic device 40 acquired by the image processing device 1*a*, the determination result can be commonly used with the image processing device 1*b*. Consequently, for example, it is possible to control the power supply to the device 70 from the power supplying unit 330*b*, from the power source control device 30*b* located in another place. According to the present embodiment, it is possible to achieve an advantageous effect that power to the device 70 connected to the power supplying unit (tap) 330 can be effectively controlled.

While the embodiments according to the present invention have been described above, the present invention is not limited to the embodiments described above, and the components can be modified and embodied without departing from the spirit of the invention. By combining a plurality of components disclosed in the embodiment described above as appropriate, various inventions may be formed. For example, some components may be deleted from all the components described in the embodiment. Furthermore, components in the different embodiments may be combined as appropriate.

For example, the power management app described above may be loaded in another image processing device 1 or an external device (such as a server device) connected to the network 80. The correspondence information storage unit 240, the determining unit 250, and the instruction unit 260 described above may be separately mounted on each of the image processing device 1, the power source control device 30, and the electronic device 40. For example, the correspondence information storage unit 240, the determining unit 250, and the instruction unit 260 described above may be separately mounted on each of the image processing device 1, the power source control device 30, the electronic device 40, and one or more external device (such as a server device).

In each embodiment described above, the main body 10 and the operation unit 20 are independently operating in a separate operating system. However, it is not limited thereto, and for example, the main body 10 and the operation unit 20 may operate in the same operating system.

The computer program to be executed in the power control system 100 of each embodiment described above may be recorded and provided on a computer-readable recording medium such as compact disc read-only memory (CD-ROM), a flexible disk (FD), a compact disc recordable (CD-R), a digital versatile disc (DVD), and a universal serial bus (USB) in an installable or executable file format, or provided or distributed via a network such as the Internet. Various computer programs may also be provided, by being incorporated in advance in a ROM or the like.

The system configuration in which the image processing device 1, the power source control device 30, and the electronic device 40 are connected in the first embodiment, and the system configuration in which the image processing devices 1a and 1b, the power source control devices 30a and 30b, and the electronic device 40 are connected in the second embodiment are only examples, and it is to be understood that various system configuration examples are applicable according to the usage and purpose.

An embodiment exhibits the advantageous effect that power to the device can be effectively controlled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power control system, comprising:
    at least one first image processing device;
    a second image processing device; and
    a power source control device configured to control power supply and shut off of power supply of a plurality of power supply taps for supplying power to a plurality of devices, wherein
    each at least first one image processing device includes:
        a sensor; and
        a first non-transitory medium including first computer readable instructions, and
        at least one first processor configured to execute the first computer readable instructions to,
            transmit a detection value detected by the sensor and first device identification information indicating the at least one first image processing device to the second image processing device,
    the second image information processing device includes:
        a second non-transitory medium comprising a memory including second computer readable instructions, and
        at least one second processor configured to execute the second computer readable instructions to,
            receive the detection value and identification information of the first image processing device from the first image processing device;
            determine whether a detection value exceeds a threshold; and
            transmit instruction information to supply power or to shut off power supply to a device of the at least one first image processing device, to a power source control device configured to supply power to a power supply tap indicated by second identification information associated with the first identification information if the detection value exceeds the threshold;
    wherein the power source control device includes a third processor, and
    a third non-transitory medium including third computer readable instructions, and
    at least one third processor configured to execute the third computer readable instructions to
        control the power supply tap to supply power and shut off power supply to the device according to the instruction information received from the second image processing device.

2. The power control system according to claim 1, wherein the at least one third processor is further configured to
    shut off power supply to a device of the plurality of devices when the detection value is determined to be equal to or less than the threshold, and
    supply power to the device when the detection value is determined to exceed the threshold.

3. The power control system according to claim 2, wherein the at least one third processor is further configured to
    shut off power supply to the device when a time during which the detection value that is equal to or less than a threshold is judged to be equal to or longer than a first time period, and
    supply power to the device when a time during which the detection value exceeds the threshold is judged to be equal to or longer than a second time period.

4. The power control system according to claim 1, wherein the at least one second processor is further configured to
    judge whether a time during which the detection value is equal to or less than the threshold is equal to or longer than a time period, and
    transmit the detection value and the first device identification information when the time during which the detection value is equal to or less than the threshold is judged to be equal to or longer than the time period.

5. The power control system according to claim 1, further comprising
    a third image processing device, and
    a second power source control device, wherein
    the at least one second processor is further configured to
        transmit a determination result being determined and third image processing device identification information to the second image processing device, and
    the third image processing device including
        a fourth non-transitory medium including fourth computer readable instructions, and
        at least one fourth processor configured to execute the fourth computer readable instructions to
            receive the determination result and the third image processing device identification information, and
            instruct the second power source control device to supply power or to shut off power supply to the third image processing device based on the determination result of the second image processing device and the third image processing device identification information of the third electronic device.

6. A power control method of a power control system including at least one electronic device, an information processing device, and a power source control device, the power control method comprising:
    transmitting a detection value detected by a sensor in the at least one electronic device and electronic device first electronic device identification information indicating a first electronic device to the information processing device;
    receiving the detection value and identification information of the information processing device;
    determining whether the detection value exceeds a threshold; and transmitting instruction information to supply power and shut off power supply to a device, to a power source control device configured to supply power to a power supply tap indicated by second identification information associated with the first identification and shut off information if the detection value exceeds the threshold; and controlling the power supply tap to supply power or shut off power supply to the device according to the instruction information received from the information processing device.

7. An information processing device, comprising:

a non-transitory medium comprising a memory including computer readable instructions, and at least one processor configured to execute the computer readable instructions to, receive a detection value and first identification information of a first image processing device from a sensor provided in each of at least one electronic device;

determine whether the detection value exceeds a threshold; and transmit instruction information to supply power or shut off power supply to a first electronic device of the at least one electronic device, to a power source control device configured to supply power to a power supply tap indicated by second identification information associated with the first identification information if the detection value exceeds the threshold; and control the power supply tap to supply power and shut off power supply to the device according to the instruction information received from the first image processing device.

8. The power control method according to claim 6, further comprising:

shutting off power supply to the device when the detection value is determined to be equal to or less than the threshold, and supplying power to the device when the detection value is judged to exceed the threshold.

9. The power control method according to claim 8, further comprising:

shutting off power supply to the device when a time during which the detection value that is equal to or less than a threshold is judged to be equal to or longer than a first time period, and supplying power to the device when a time during which the detection value exceeds the threshold and is judged to be equal to or longer than a second time period.

10. The power control method according to claim 6, further comprising:

judging whether a time during which the detection value is equal to or less than the threshold is equal to or longer than a time period, and transmitting the first device identification information when the time during which the detection value is equal to or less than the threshold is judged to be equal to or longer than the time period.

11. The information processing device according to claim 7, wherein the at least one processor is further configured to shut off power supply to the device when the detection value is determined to be equal to or less than the threshold, and supply power to the device when the detection value is judged to exceed the threshold.

12. The information processing device according to claim 11, wherein the at least one processor is further configured to shut off power supply to the image processing device when a time during which the detection value that is equal to or less than a threshold is judged to be equal to or longer than a first time period, and supply power to the image processing device when a time during which the detection value exceeds the threshold and is judged to be equal to or longer than a second time period.

13. The information processing device according to claim 7, wherein wherein the at least one processor is further configured to judge whether a time during which the detection value is equal to or less than the threshold is equal to or longer than a time period, and transmit the first device identification information when the time during which the detection value is equal to or less than the threshold is judged to be equal to or longer than the time period.

14. The power control system according to claim 1, wherein the second image processing device further includes, an operation unit and a main body, the operation unit including, separate from the main body, the at least one second processor and the second non-transitory medium, the second non-transitory medium including an operating system, and the at least one second processor further configured to execute instructions to control power to each at least one electronic device.

15. The power control system according to claim 1, wherein the at least one image processing device comprises a plurality of second image processing devices each including an illuminance sensor, each of the plurality of second image processing devices including at least one second image processing device processor configured to determine whether a local illuminance sensor has been triggered, and shut off power supply of devices connected to outlets of taps when the local illuminance sensor is triggered.

16. The power control system according to claim 15, wherein the at least one second processor is further configured to shut off a single power supply device of the power supply devices connected to the outlets of a single tap.

17. The power control system according to claim 15, wherein the at least one second processor is further configured to acquire a power consumption amount of the devices connected to the outlets of the taps of the power source.

18. The power control system according to claim 1, wherein the sensor included in each at least one first image processing device is an illuminance sensor, and the second processor is further configured to determine whether a user is near a first image processing device when determining that an illuminance transmitted from the first image processing device is less than the threshold, and transmit the instruction information to instruct to shut off power supply of a tap installed around the first image processing device, to the power source control device configured to control power supply of the tap.

19. The power control method according to claim 6, further comprising determining whether a user is near a first image processing device when determining that an illuminance transmitted from the first image processing device is less than the threshold, and transmitting the instruction information to instruct to shut off power supply of a tap installed around the first image processing device, to the power source control device configured to control power supply of the tap; and wherein the sensor included in each at least one first image processing device is an illuminance sensor.

20. The information processing device according to claim 7, wherein the sensor included in each at least one first image processing device is an illuminance sensor, and the at least one processor is further configured to determine whether a user is near a first image processing device when determining that an illuminance transmitted from the first image processing device is less than the threshold, and transmit the instruction information to instruct to shut off power supply of a tap installed around the first image processing device, to the power source control device configured to control power supply of the tap.

* * * * *